(12) United States Patent
Liu et al.

(10) Patent No.: US 11,899,644 B2
(45) Date of Patent: Feb. 13, 2024

(54) TECHNIQUE OF EFFICIENTLY, COMPREHENSIVELY AND AUTONOMOUSLY SUPPORT NATIVE JSON DATATYPE IN RDBMS FOR BOTH OLTP AND OLAP

(71) Applicant: Oracle International Corporation, Redwood Shores, CA (US)

(72) Inventors: Zhen Hua Liu, San Mateo, CA (US); Sriram Krishnamurthy, San Francisco, CA (US); Beda C. Hammerschmidt, Los Gatos, CA (US); Douglas J. McMahon, Redwood City, CA (US); Hui Joe Chang, San Jose, CA (US); Ying Lu, Sunnyvale, CA (US); Joshua Spiegel, St. Louis, MO (US); Srikrishnan Suresh, Belmont, CA (US); Vikas Arora, Burlingame, CA (US); Geeta Arora, Union City, CA (US); Sundeep Abraham, Redwood City, CA (US); Hui Zhang, San Ramon, CA (US); Alfonso Colunga Sosa, Redwood City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 17/860,187

(22) Filed: Jul. 8, 2022

(65) Prior Publication Data
US 2022/0342864 A1 Oct. 27, 2022

Related U.S. Application Data

(62) Division of application No. 16/904,417, filed on Jun. 17, 2020, now Pat. No. 11,423,001.

(Continued)

(51) Int. Cl.
*G06F 16/22* (2019.01)
*G06F 16/2455* (2019.01)
(Continued)

(52) U.S. Cl.
CPC ...... *G06F 16/2282* (2019.01); *G06F 11/3409* (2013.01); *G06F 16/221* (2019.01);
(Continued)

(58) Field of Classification Search
CPC ........ G06F 16/22; G06F 16/86; G06F 16/288; G06F 16/221; G06F 16/248; G06F 16/3331; G06F 16/81
(Continued)

(56) References Cited

U.S. PATENT DOCUMENTS

| 7,877,400 B1 | 1/2011 | Matthew |
| 9,659,045 B2 | 5/2017 | Liu et al. |

(Continued)

FOREIGN PATENT DOCUMENTS

| WO | WO 03/107222 A1 | 12/2003 |
| WO | WO 2008/091705 A2 | 7/2008 |

(Continued)

OTHER PUBLICATIONS

Shukla et al., "Schema-Agnostic Indexing with Azure DocumentDB", Proceedings of the VLDB Endowment, vol. 8, No. 12, Copyright 2015 VLDB, 12 pages.

(Continued)

*Primary Examiner* — Hung T Vy
(74) *Attorney, Agent, or Firm* — Hickman Becker Bingham Ledesma LLP; Brian Miller

(57) ABSTRACT

Herein is a self-tuning database management system (DBMS) storing JavaScript object notation (JSON) documents and operating a JSON datatype as native to the DBMS. In an embodiment, a computer hosts a DBMS that (Continued)

executes a data definition language (DDL) statement that defines, in a database dictionary of the DBMS, a JSON document column of a database table that stores JSON documents as instances of the JSON datatype that is native in the DBMS. The DBMS may autonomously set or adjust configuration settings that control behaviors such as a default width of a JSON document column, in lining or not of the JSON document column, kind and scope and duration of indexing of the JSON document column, and/or caching of the JSON document column such as in an in memory columnar unit (IMCU). The DBMS may use the various configuration settings to control how JSON documents and the native JSON datatype are stored and/or processed.

18 Claims, 14 Drawing Sheets

Related U.S. Application Data

(60) Provisional application No. 62/900,410, filed on Sep. 13, 2019.

(51) Int. Cl.
  *G06F 16/248* (2019.01)
  *G06F 11/34* (2006.01)
  *G06F 16/242* (2019.01)

(52) U.S. Cl.
  CPC .......... *G06F 16/244* (2019.01); *G06F 16/248* (2019.01); *G06F 16/24552* (2019.01); *G06F 16/24556* (2019.01)

(58) Field of Classification Search
  USPC ....................................................... 707/769
  See application file for complete search history.

(56) References Cited

U.S. PATENT DOCUMENTS

| | | | |
|---|---|---|---|
| 9,864,816 B2 * | 1/2018 | Liu | G06F 16/88 |
| 10,552,443 B1 * | 2/2020 | Wu | G06F 16/258 |
| 11,423,001 B2 * | 8/2022 | Liu | G06F 16/2282 |
| 2004/0073541 A1 | 4/2004 | Lindblad | |
| 2005/0044089 A1 | 2/2005 | Wu | |
| 2008/0065596 A1 | 3/2008 | Shadmon | |
| 2009/0307241 A1 | 12/2009 | Schimunek et al. | |
| 2010/0325169 A1 | 12/2010 | Loh | |
| 2012/0036133 A1 | 2/2012 | Chen et al. | |
| 2014/0095519 A1 | 4/2014 | Liu et al. | |
| 2015/0039587 A1 | 2/2015 | Liu et al. | |
| 2015/0134670 A1 | 5/2015 | Liu | |
| 2016/0321375 A1 * | 11/2016 | Liu | G06F 16/88 |
| 2017/0060973 A1 | 3/2017 | Liu | |
| 2019/0286722 A1 | 9/2019 | Barov | |
| 2020/0210398 A1 | 7/2020 | Liu | |
| 2021/0081389 A1 | 3/2021 | Liu et al. | |

FOREIGN PATENT DOCUMENTS

| | | |
|---|---|---|
| WO | WO 2012/032184 A1 | 3/2012 |
| WO | WO 2015/069941 A1 | 5/2015 |
| WO | WO 2017/070188 A1 | 4/2017 |

OTHER PUBLICATIONS

Oracle Database, "Introduction to Simple Oracle Document Access (SODA)", 18c E86033-04, dated Aug. 2018, 96 pages.

Modern SQL, "What's New in SQL", dated Jun. 15, 2017, 19 pages.

Microsoft, "Database Instant File Initialization", SQL Server 2016, https://msdn.microsoft.com/en-us/library/ms175935.aspx, 3 pages.

McHugh et al., "Lore: A Database Management System for Semistructured Data", SIGMOD, vol. 26 No. 3, dated Sep. 3, 1997, 14 pages.

Liu et al., "Closing the Functional and Performance Gap bBtween SQL and NoSQL", ACM 978-1-4503-3531-7, dated Jun. 26, 2016, 12 pages.

Khan et al., "SQL Support Over Mongo DB Using Metadata", International Journal of Scientific and Research Publications, vol. 3, Issue 10, dated Oct. 2013, 5 pages.

IMB, "BSON and JSON Built-in Opaque Data Types", https://www.ibm.com/support/knowledgecenter/en/SSGU8G_12.1.0/com.ibm.sqls.doc/ids_sqs_1770.htm, last viewed on Jun. 18, 2020, 9 pages.

Chasseur et al., "Enabling JSON Document Stores in Relational Systems", WebDB dated 2013, New York, New York, USA, 16 pages.

Candillier et al., "Mining XML Documents" in: Data Mining Patterns: New Methods and Applications, dated Nov. 19, 2007, IGI Global, 28 pages.

Cai et al., "Integrated Querying of SQL database data and S3 data in Amazon Redshift", IEEE, dated 2018, 9 pages.

Boicea et al., "MongoDB vs Oracle—database comparison", dated Sep. 2012, 7 pages.

Arora et al., "Modeling and Querying Data in Mongo DB", International Journal of Scientific & Engineering Research, vol. 4, Issue 7, Jul. 2013, 4 pages.

* cited by examiner

FIG. 3

DATABASE TABLE 300

| | LOGICAL 308 | | STORAGE 306 | | | MEMORY 304 |
|---|---|---|---|---|---|---|
| | JSON DOCUMENT COLUMN 331 | VIRTUAL COLUMN 332 | VOLATILE DATA UNITS 341 | PERSISTENCE DATA UNITS 342 | | BUFFER CACHE 302 |
| TABLE ROW 310 | JSON DOCUMENT 350 | | | DATABASE BLOCK 371 | | |
| TABLE ROW 311 | JSON DOCUMENT 351 | | | | | |
| TABLE ROW 312 | JSON DOCUMENT 352 | | | DATABASE BLOCK 372 | | |
| TABLE ROW 313 | JSON DOCUMENT 353 | | | | | |
| TABLE ROW 314 | JSON DOCUMENT 354 | INDEX 391 | IN MEMORY COMPRESSION UNIT 381 | DATABASE BLOCK 373 | | |
| TABLE ROW 315 | JSON DOCUMENT 355 | | | | | |
| TABLE ROW 316 | JSON DOCUMENT 356 | INDEX 392 | IN MEMORY COMPRESSION UNIT 382 | DATABASE BLOCK 374 | | |
| TABLE ROW 317 | JSON DOCUMENT 357 | | | | | |
| TABLE ROW 318 | JSON DOCUMENT 358 | | | DATABASE BLOCK 375 | | |
| TABLE ROW 319 | JSON DOCUMENT 359 | | | | | |

FIG. 6

DATABASE MANAGEMENT SYSTEM 600

| ROW 660 | | |
|---|---|---|
| ZERO WIDTH | WIDTH A | WIDTH B |
| VIRTUAL COLUMN 611 | JSON DOCUMENT COLUMN 612 | LOB COLUMN 613 |

| | |
|---|---|
| | JSON DOCUMENT 621 |
| INDEX 630 | JSON DOCUMENT 622 |
| | JSON DOCUMENT 623 |
| | JSON DOCUMENT 624 |

MEMORY 640

DATABASE BLOCK 670

FIG. 8

DATABASE MANAGEMENT SYSTEM 800

| | | AGGREGATE VALUES 840 |
|---|---|---|
| JSON DOCUMENT 811 | | |
| JSON DOCUMENT 812 | VALUE A | |
| JSON DOCUMENT 813 | VALUE B | |
| JSON DOCUMENT 814 | | |
| AGGREGATION FUNCTION 830 | | |

TECHNIQUE OF EFFICIENTLY, COMPREHENSIVELY AND AUTONOMOUSLY SUPPORT NATIVE JSON DATATYPE IN RDBMS FOR BOTH OLTP AND OLAP

BENEFIT CLAIM; RELATED CASES

This application claims the benefit as a divisional of application Ser. No. 16/904,417, filed Jun. 17, 2020, by Zhen Hua Liu et al., the entire contents of which is hereby incorporated by reference, which claims the benefit under 35 U.S.C. § 119(e) of provisional application 62/900,410, filed Sep. 13, 2019, the entire contents of which is hereby incorporated by reference. The following cases are related and are each incorporated herein by reference in entirety.

- U.S. Pat. No. 10,262,012, Techniques Related to Binary Encoding of JSON documents to Support Efficient Path Navigation of the JSON documents, filed by Zhen Hua Liu, et al. on Aug. 26, 2015;
- U.S. Pat. No. 10,296,462, Method To Accelerate Queries Using Dynamically Generated Alternate Data Formats In Flash Cache, filed by Juan Loaiza, et al. on Mar. 15, 2013;
- U.S. Pat. No. 9,864,816, Dynamically Updating Data Guide for JSON documents, filed by Zhen Hua Liu, et al., on Apr. 29, 2015;
- U.S. patent application Ser. No. 16/022,465, Techniques for Enabling and Integrating In-Memory Semi-Structured Data and Text Document Searches With In-Memory Columnar Query Processing, filed by Zhen Hua Liu, et al. on Jun. 28, 2018;
- U.S. patent application Ser. No. 16/863,268, Technique of Supporting Piecewise Update of JSON Document Efficiently, filed by Zhen Hua Liu, et al., on Apr. 30, 2020.

The following non-patent literature (NPL) is related and incorporated herein by reference in entirety.

- Closing the Functional and Performance Gap Between SQL and NoSQL, by Zhen Hua Liu, et al., SIGMOD '16 Proceedings of the 2016 International Conference on Management of Data, pages 227-238, Jun. 26, 2016.

FIELD OF THE INVENTION

The present invention relates to a self-tuning datastore of JavaScript object notation (JSON) documents. Herein are integration and optimization techniques for operating a JSON datatype that is native to a relational database management system (RDBMS).

BACKGROUND

JavaScript object notation (JSON) is a lightweight data specification language. A JSON object comprises a collection of fields, each of which is a field name/value pair. A field name is in effect a tag name for a node in a JSON object. The name of the field is separated by a colon from the field's value. A JSON value may be:

An object, which is a list of fields enclosed in braces "0" and separated within the braces by commas. An array, which is a list of comma separated JSON values enclosed in square brackets "H". A field value, which is a string, number, true, false, or null.

The following JSON object J is used to illustrate JSON.

```
{
  "CUSTOMER": "EXAMPLE LIMITED",
  "CUSTOMER TYPE": "BUSINESS",
  "ADDRESS": {
    "STREETADDRESS": "101 99TH STREET",
    "CITY": "NORTH POLE",
    "STATE": "AK",
    "POSTALCODE": "95110"
  },
  "PHONENUMBERS": [
    "408 555-1234",
    "408 555-4444"
  ]
}
```

Object J contains fields CUSTOMER, CUSTOMER TYPE, ADDRESS, STREETADDRESS, CITY, STATE, POSTALCODE, and PHONENUMBERS. CUSTOMER and CUSTOMER TYPE have string values "EXAMPLE LIMITED" and "BUSINESS", respectively. ADDRESS is an object containing member fields STREETADDRESS, CITY, STATE, and POSTALCODE. PHONENUMBERS is an array comprising string values "408 555-1234" and "408 555-4444". A field such as POSTALCODE may be subsequently parsed as another primitive datatype such as an integer such as for: schematic validation, storage that is compact and/or strongly typed, and/or analytics or further processing such as arithmetic.

Efficient querying is important to accessing JSON documents. Effective approaches for querying JSON documents include schema-based approaches. One schema-based approach is the schema-based relational-storage approach. In this approach, collections of JSON documents are stored as schema instances within tables of a database managed by a database management system (DBMS). That approach leverages the power of object-relational DBMS's to index and query data. In general, the schema-based relational-storage approach involves registering a schema with a DBMS, which generates tables and columns needed to store the attributes (e.g. elements, fields) defined by the schema.

Storing a collection of JSON documents as instances of a schema may require developing a schema that defines many if not all attributes found in any member of a collection. Some or many of the attributes defined by the schema may only occur in a relatively small subset of the collection members. The number of attributes defined by a schema may be many times larger than the number of attributes of many collection members. Many attributes may be sparsely populated. Managing schemas with a relatively large number of attributes, some or many of which may be sparsely populated, can be burdensome to a DBMS and administrators and users of the DBMS.

To avoid pitfalls of using schema-based approaches, schema-less approaches may be used. One schema-less approach is the partial projection approach. Under the partial projection approach, a set of commonly queried attributes of the collection are projected and copied into columns of additional tables; these tables exist to support DBMS indexing of the columns using, for example, binary tree or bit map indexing. The approach works most optimally when the query workload for the collection is known to follow a pattern, so that commonly queried attributes can be determined. The approach works less optimally when the workload is ad-hoc and the number of attributes to project cannot be easily constrained to a relatively small number. Also, many of the unprojected attributes must be searched using text search or functional evaluation against collection members. In general, schema-based approaches provide more efficient ad hoc querying based on structural features.

Being a minimalist semi-structured data model, JSON is a de-facto standard for schema-less development in database markets. Both RDBMS vendors and No-SQL vendors have supported JSON functionality to various degrees. The current status is that most RDBMS vendors support JSON text storage in a varchar or character large object (CLOB) text column and apply structured query language (SQL) and/or JSON operators over the JSON text, as is specified by the SQL/JSON standard. For example, an 'IS JSON' standardized check reveals a pseudo-type approach that may be difficult to optimize and does not entail a database native datatype for JSON.

The approaches described in this section are approaches that could be pursued, but not necessarily approaches that have been previously conceived or pursued. Therefore, unless otherwise indicated, it should not be assumed that any of the approaches described in this section qualifies as prior art merely by virtue of their inclusion in this section.

BRIEF DESCRIPTION OF THE DRAWINGS

In the drawings:

FIG. 3 is a block diagram that depicts an example DBMS that uses a virtual column of a database table to access an index of JSON documents stored in the database table;

FIG. 6 is a block diagram that depicts an example DBMS that efficiently arranges data structures in storage such as memory and/or disk;

FIG. 8 is a block diagram that depicts an example DBMS that executes a structured query language (SQL) statement by applying an aggregate function to array(s) in JSON document(s);

DETAILED DESCRIPTION

Figure 1:
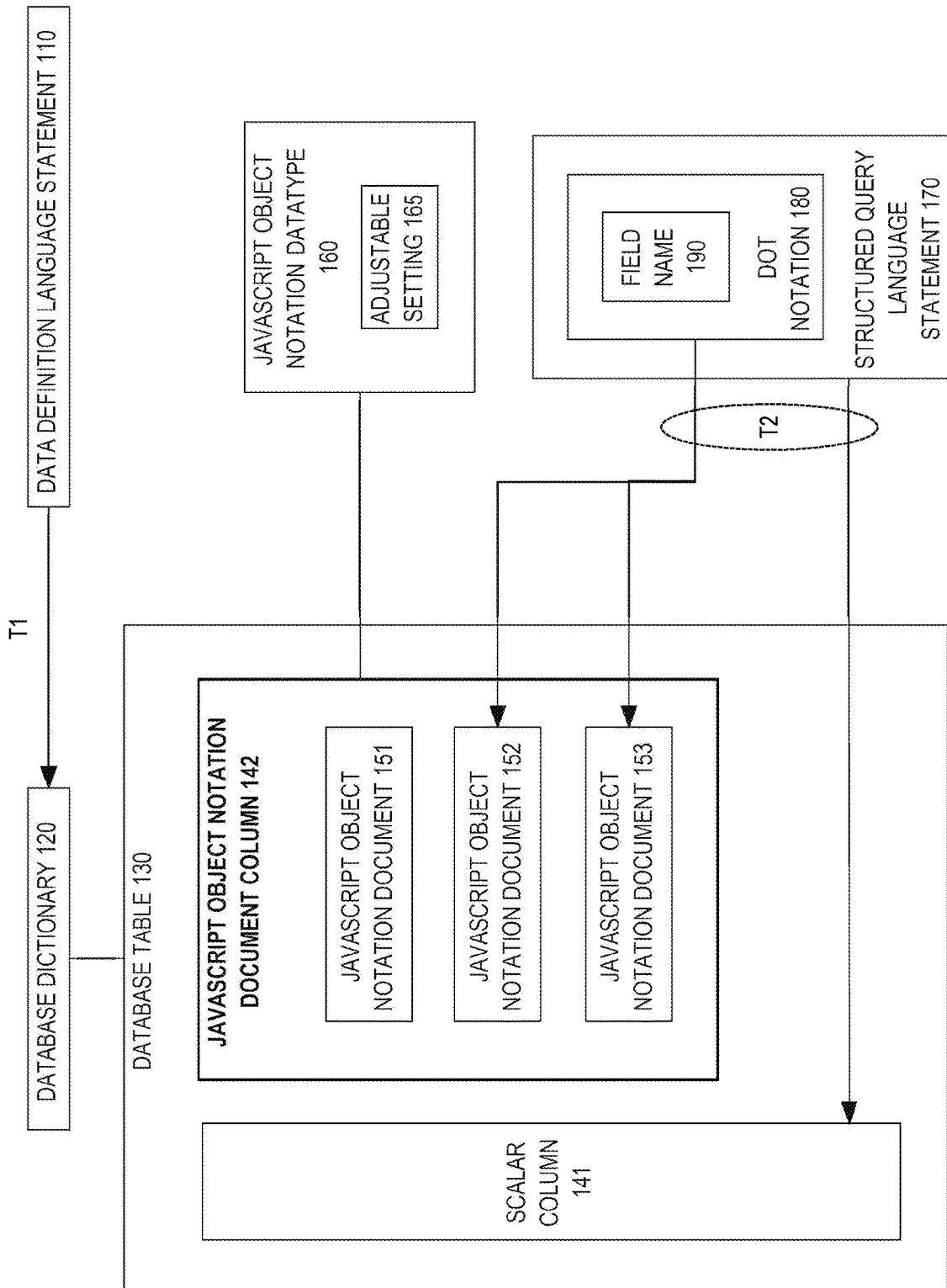
FIG. 1 is a block diagram that depicts an example database management system (DBMS) that uses dot notation to operate a JavaScript object notation (JSON) document column and a JSON datatype that is native to the DBMS.

In the following description, for the purposes of explanation, numerous specific details are set forth in order to provide a thorough understanding of the present invention. It will be apparent, however, that the present invention may be practiced without these specific details. In other instances, structures and devices are shown in block diagram form in order to avoid unnecessarily obscuring the present invention.

General Overview

Described herein are approaches and techniques to efficiently and autonomously support a native JavaScript object notation (JSON) datatype in a relational database management system (RDBMS), such as with an object relational database, for diverse workloads, including online transaction processing (OLTP) and online analytical processing (OLAP). The native JSON datatype is binary and self contained (i.e. schema less). Aspects of the native JSON datatype are comprehensively incorporated into an RDBMS ecosystem that may include: an RDBMS server, various clients coded in variety of programming languages, various database access tools (e.g. database programs for import, export, and replication) that together form an operationally complete stack with JSON as a built-in first-class datatype. The JSON datatype is designed to be easy to use, as autonomous as possible, and to integrate and collaborate well with many latest advanced RDBMS features. Herein are high performance techniques for the JSON datatype in the RDBMS with a focus on efficiency and autonomy so that users do not need to tune to take advantage of latest advanced performance enhancements of the RDBMS for both OLTP and OLAP, deployed in cloud or on premise.

The JSON datatype herein is implemented in a way to be able to integrate and leverage advanced and latest RDBMS features, including: in-memory data and indices, mem-optimized write, parallel query, sharding, multi-tenant, transactional/statement refreshable materialized view, autonomous indexing, and full text and spatial search/query in JSON documents. The JSON datatype implementation herein autonomously self-tunes to avoid hand tuning for important but very different usages such as OLTP and OLAP, as explained later herein. In an embodiment, a single binary JSON storage model, based on the RDBMS's native JSON datatype, provides both jump query navigation and physical piecewise partial update performance capabilities that state of the art relational databases and document datastores lack.

In an embodiment, a computer hosts a database management system (DBMS) that executes a data definition language (DDL) statement that defines, in a database dictionary of the DBMS, a JSON document column of a database table that stores JSON documents as instances of a JSON datatype that is native in the DBMS. A structured query language (SQL) statement is received that contains dot notation that contains a field name that is not defined in the database dictionary. Execution of the SQL statement accesses a scalar column of the database table that is defined in the database dictionary. The dot notation executes by using the field name and the JSON datatype that is native in the DBMS to access at least a portion of at least one of the JSON documents.

Each JSON document may be stored in a separate row of the database table. In an embodiment, at least the JSON document column of a subset of the table rows are loaded into volatile memory. Content index(es) are generated in memory for the JSON documents of the loaded rows. The index is generated when the row subset is loaded into memory. The JSON documents and their index are stored together in an in memory columnar unit (IMCU), which may operate as a unit of JSON document caching. JSON documents are stored as instances of the native JSON datatype, regardless of storage in an IMCU (i.e. column major) or in a database block (i.e. row major). As instances of the binary native JSON datatype, JSON documents may be copied as binary large objects (BLOBs) from the database block into the IMCU. In an embodiment, the IMCU also stores other column(s) of the loaded rows. In an embodiment, the index is conditionally created, such as when memory is not low and/or when a subset of JSON documents is in high demand. In an embodiment, a virtual column of the database table is used to access indices of multiple subsets of loaded rows of the database table.

In an embodiment, the DBMS receives a SQL statement that specifies an aggregation function. The DBMS identifies a subset of stored JSON documents that satisfy the SQL statement. An aggregation function is individually applied to each JSON document of the subset of JSON documents to calculate a respective aggregate value of a set of aggregate values for the subset of JSON documents. A result set is generated that contains the set of aggregate values for the subset of JSON documents.

In an embodiment, a computer hosts a client that sends, to the DBMS, a SQL statement that references: a) a scalar column that is defined in a database dictionary of the DBMS for the database table, and b) the JSON document column in the database table. The client receives a binary JSON document from the DBMS. After receiving the binary JSON document, the client uses dot notation to access a field in the binary JSON document without unpacking or decoding the binary JSON document.

1.0 Example Computer with Database Management System

FIG. 1 is a block diagram that depicts an example database management system (DBMS) 100, in an embodiment. DBMS 100 uses dot notation to operate a JavaScript object notation (JSON) document column and a JSON datatype that is native to DBMS 100. DBMS 100 is hosted on at least one computer (not shown) such as a rack server such as a blade, a personal computer, a mainframe, a virtual computer, or other computing device. Such computer(s) may be interconnected by a communication network (not shown). In an embodiment, DBMS 100 is a relational DBMS (RDBMS).

DBMS 100 contains at least one database (not shown), such as a relational database and/or an object relational database. The database may contain database table(s) such as database table 130, such as a relational table. In an embodiment as shown, database table 130 is defined in database dictionary 120 of DBMS 100. DBMS 100 may operate database dictionary 120 as a namespace that contains definitions of (e.g. named) database objects.

For example, database dictionary 120 may comprise an associative structure, such as a lookup table or hash table, that maps keys (e.g. unique names) to values that are defined database objects. Database dictionary 120 may store metadata such as schematic details such as definitions of database tables, table columns, and datatypes. DBMS 100 may refer to database dictionary 120 during command (e.g. query) execution to retrieve definitions of database objects that participate in or otherwise contribute to the command execution. For example, a query planner may use database dictionary 120 for semantic analysis and/or optimization of a structured query language (SQL) statement.

Database dictionary 120 may be modified by executing a data definition language (DDL) statement, such as DDL statement 110. For example, a DDL statement may define a new database object and, in database dictionary 120, bind the object to a key that may subsequently be used as a lookup key to retrieve the object.

Database table 130 contains (e.g. many) rows and at least table columns 141-142. JSON document column 142 may store a JSON document, such as JSON documents 151-153, in each row of database table 130. In operation at time T1, DDL statement 110 defines JSON document column 142 in database dictionary 120. In one example, DDL statement 110 is an ALTER statement that adds new JSON document column 142 to already defined database table 130. In another example, DDL statement 110 is a CREATE statement that defines both of new database table 130 and JSON document column 142. In either case, DDL statement 110 specifies that JSON document column 142 has, as its column type, JSON datatype 160 that is discussed later herein.

Depending on the embodiment, JSON documents 151-153 may be an entirely or somewhat self-contained dataset that is hierarchical and structured or semi-structured. Each of JSON documents 151-153 may have a multipurpose internet mail extensions (MIME) type and/or be capable of transfer (e.g. serialization) as text. A JSON document is self contained because it can be fully interpreted without external data references and without external metadata, such as an external data dictionary or schema, where external here means outside of the JSON document, not necessarily outside of DBMS 100. Each of JSON documents 151-153 may be stored as a self-contained unit and managed (e.g. exchanged with clients and/or durably stored) in a binary encoding, such as a data structure, such as JSON datatype 160. In an embodiment, JSON datatype 160 is Oracle's OSON that is an optimized binary JSON format that is discussed later herein.

Each of JSON documents 151-153 is an instance of JSON datatype 160 that is a binary datatype. JSON datatype 160 is not raw text, such as with conventional JSON. JSON datatype 160 is native to DBMS 100, which means that JSON datatype 160 is a built in datatype and not a user defined datatype (UDT). In an embodiment not shown, JSON datatype 160 is defined in database dictionary 120.

In various embodiments, a client's database driver (not shown) and/or DBMS 100 may (e.g. bidirectionally) transcode between OSON and JSON, and/or between OSON and a (e.g. custom or specialized) document object model (DOM). In an embodiment, the client's database driver and/or DBMS 100 can detect a datatype mismatch and automatically and implicitly convert in either direction between JSON datatype 160 and a non-document datatype. For example, a binary JSON document may be automatically converted or cast to a binary large object (BLOB). Automatic decoding (i.e. conversion of JSON datatype 160 to text such as raw JSON or a character large object, CLOB) may entail automatic rendering as text. Automatic encoding (i.e. conversion into binary JSON datatype 160) may entail any of: a) verification that a BLOB is properly formatted, such as OSON, orb) more or less strict parsing of text. Format verification is further discussed later herein.

When scalar datatypes within JSON datatype 160 and DBMS 100 are identical, then DBMS 100 may directly use document field values without conversion and with increased efficiency. Even when scalar datatypes within JSON datatype 160 and DBMS 100 differ, automatic conversion may occur that does not entail intermediate conversions to and from text as an intermediate form. That is, DBMS 100 may more or less avoid text entirely when processing binary values in instances of JSON datatype 160.

OSON enables more efficient query execution and partial updating of JSON documents. Specifically, OSON enables fast storage-side index maintenance during: a) execution of data manipulation language (DML) such as a SQL query, b) making partial JSON document update feasible by, among other things, reducing re-do logging overhead, and c) accelerating path queries because the OSON format itself is a DOM tree.

OSON accelerates JSON as follows. With OSON, efficient storage and navigation of JSON may be achieved based on encoding a tree node structure that enables skipping irrelevant child nodes. Each parent node may include a first mapping that indicates a byte offset for each of its child nodes. If a parent node has one or more child nodes that each correspond to a field name, the parent node may also include a second mapping that maps a field name to each child node of the parent node. Thus, if a path expression includes a particular field name, the tree node that corresponds to the particular field name may be identified without scanning any tree nodes unrelated to the path expression.

Further efficiency in storage and navigation of JSON may be achieved based on field-name identifiers that numerically represent field names so as to enable a binary search to be performed on the second mapping for a particular field name. Even further efficiency may be achieved when field-name identifiers are binary numbers. A third mapping may be used to store the relationship between field names and field-name identifiers.

The algorithmic complexity of navigating JSON may also be reduced by consolidating duplicate field names. A hash function may be used to assign a hash code to each unique field name. Each hash code may be associated with field names in the third mapping based on a fourth mapping that stores the relationship between hash codes and field-name identifiers.

In the above ways, OSON saves execution time and/or storage space of DBMS 100. The many savings by OSON accrue without imposing a shared schema upon JSON documents 151-153. That is, like JSON, OSON is schemaless. Example implementations of OSON are described in:

U.S. Pat. No. 10,262,012, Techniques Related to Binary Encoding of JSON documents to Support Efficient Path Navigation of the JSON documents, and Closing the Functional and Performance Gap Between SQL and NoSQL, SIGMOD '16.

DBMS 100 may have clients (not shown) that submit database commands such as SQL statements to access JSON documents 151-153 and/or database table 130. In various embodiments, database commands may be expressed as data manipulation language (DML), such as SQL, as query by example (QBE), as create read update delete (CRUD), JSON, JavaScript, or other request format.

At time T2, execution of SQL statement 170 accesses table columns 141-142. Scalar column 141 is a typical table column that has a scalar datatype that may be built in or user defined, such as text or numeric. In various examples, SQL statement 170 uses column 141 and/or 142 for filtration and/or projection. For example within SQL statement 170, a WHERE clause may use scalar column 141 for filtration to identify a subset of JSON documents 151-153, and a SELECT clause may use JSON document column 142 for projection (i.e. retrieval) of portions of documents of that subset. In other examples, both columns 141-142 are used for filtration, and/or both columns 141-142 are used for projection.

SQL statement 170 contains dot notation 180 that is an operable expression. Dot notation 180 may operate as a selector or projector that can hierarchically navigate internals of one, some, or all of JSON documents 151-153. Typically, dot notation 180 contains a sequence of (e.g. period separated) terms such as field names for JSON such as may occur in none, some, or all of JSON documents 151-153.

In a predicate and/or an assignment, dot notation 180 may conform to an expression language such as JSON, a subset of JavaScript, extensible markup language (XML) path (XPath), or a regular expression. The expression language may navigate, select, filter, and/or assign content within one or many persistent JSON documents such as JSON documents 151-153.

DBMSs herein may be polyglot with a JSON expression language embedded into a native DML language such as SQL. A Turing complete example JSON expression language that is embedded within SQL for finding, navigating, reading, and writing sets and portions of JSON documents stored in relational tables is presented in related U.S. patent application Ser. No. 16/863,268, Technique of Supporting Piecewise Update of JSON Document Efficiently. Sufficient integration of JSON into SQL is provided by the SQL:2016 standard and related non-patent literature (NPL) "Technical Report ISO/IEC TR 19075-6", both of which define and standardize built in functions that convert JSON into relational data or otherwise access JSON data from SQL, including functions such as JSON_TABLE and JSON_EXISTS as explained therein.

Dot notation 180 may conform to some subset of JavaScript itself. In one embodiment, (e.g. inside DBMS 100) a JavaScript interpreter or compiler may parse and/or execute dot notation 180. For example, dot notation 180 may be a JavaScript expression or XPath-like expression. In another embodiment, a regular expression (regex) parser or other lexer may tokenize dot notation 180 into a sequence of meaningful tokens. In various examples, dot notation 180 filters and/or projects JSON data. For example, dot notation 180 may occur in a WHERE clause and/or a SELECT clause of SQL statement 170. In another example, SQL statement 170 contains other JavaScript dot notation expression(s), in addition to dot notation 180. For example, multiple projection columns (e.g. of a result set as discussed later herein) may be defined by respective dot notation expressions, such as 180. Likewise, a compound predicate (i.e. filtration) may combine multiple dot notation filters, such as 180.

Dot notation 180 may specify a path into JSON document(s) that is interpreted from left to right. For example, dot notation 180 may be:

$car[2-6].axle[1].tire[*].pressure<25

The dollar sign indicates an absolute path into a current JSON object, which may be a top-level object, such as a JSON document, or a nested JSON object, such as a JSON field value or a JSON array element. Without the dollar sign, the path is relative and may begin matching at the current JSON object or any JSON object nested within the current JSON object at any nesting depth.

Brackets index into a JSON array, and the offset is 1-based. For example, axle[1] species a first element, which may be a front axle. Likewise, car[2-6] is a slice (i.e. subset) of five cars within a (e.g. larger) JSON array. The asterisk in tire[*] is a wildcard that matches all array elements which, in this example, is the same as tire[1-4] because each car has four tires.

All of the field names within dot notation 180 must match the names of nested JSON objects in that ordering during a descent into the internal hierarchy of a JSON object. Thus, a dot notation of car.axle by itself specifies navigation that may also achieve some filtration. For example a car that has no axles does not match. Likewise, pressure<25 imposes additional filtration which, in this example, matches under-inflated tires.

Thus, dot notation 180 may be used for filtration. Dot notation 180 may instead be used for projection. For example, car.licensePlate reports the license plate of any matching car which, in this example, have a flat tire.

Because JSON may lack a schema (i.e. schema-less), internal structure (e.g. names and types of fields) of JSON documents 151-153 need not be defined in database dictionary 120. Thus JSON document field name(s), such as field name 190, that occur in dot notation 180 are not defined in database dictionary 120. For example, execution of dot notation 180 need not use database dictionary 120. In some examples, execution of SQL statement 170 generates a result set (not shown) that may contain values from one or both of columns 141-142. For example as discussed later herein, the result set may contain whole JSON document(s), portion(s) of JSON document(s), and/or (e.g. scalar) field values extracted from JSON document(s).

Accessing fields of a schema-less JSON document by dot notation 180 is in stark contrast to use of dot notation to access schematically rigid objects such as instances of a user-defined type (UDT) or object class defined in DBMS 100. Only member attributes of a UDT or object that are defined in database dictionary 120 may be accessed by SQL statements. Attempting to access a member undefined in database dictionary 120 causes a semantic error when DBMS 100 compiles the SQL statement. However, such an error is not generated when compiling a SQL statement that refers to a JSON field even though that field is undefined in a database dictionary.

JSON datatype 160 integrates and leverages advanced and latest RDBMS features, including: in-memory data and indices, mem-optimized write, parallel query, sharding, multi-tenant, transactional/statement refreshable materialized view, autonomous indexing, and full text and spatial search/query in JSON documents. JSON datatype 160 autonomously self tunes to avoid hand tuning for important but very different, or even antagonistic, usages such as OLTP and OLAP, as explained later herein. Various configuration settings, such as adjustable stetting 165, for JSON datatype 160 are autonomously initialized and/or adjusted by DBMS 100 as discussed later herein. For example as explained later herein, DBMS 100 may autonomously set or adjust adjustable stetting 165 that control behaviors such as a default width of JSON document column 142, in lining or not of JSON document column 142, kind and scope and duration of indexing of JSON document column 142, and/or caching of JSON document column 142 such as in an in memory columnar unit (IMCU). DBMS 100 may use the adjustable stetting 165 to control how JSON documents are stored and/or processed as discussed herein. The various configuration settings, such as adjustable stetting 165, may control how JSON datatype 160 and/or JSON document column 142 operate as discussed herein. DBMS 100, JSON datatype 160, and JSON document column 142 may autonomously self-tune for concerns such as efficiency by intelligently initializing and/or adjusting those configuration settings without needing manual intervention such as by a database administrator (DBA).

DBMS 100 is internally scalable beyond what is shown. For example, DBMS 100 may have other table(s) that also have a JSON document column and/or a scalar column. Database table 130 may have multiple JSON document columns and/or multiple scalar columns.

2.0 Example Native JSON Datatype Processing

Figure 2:
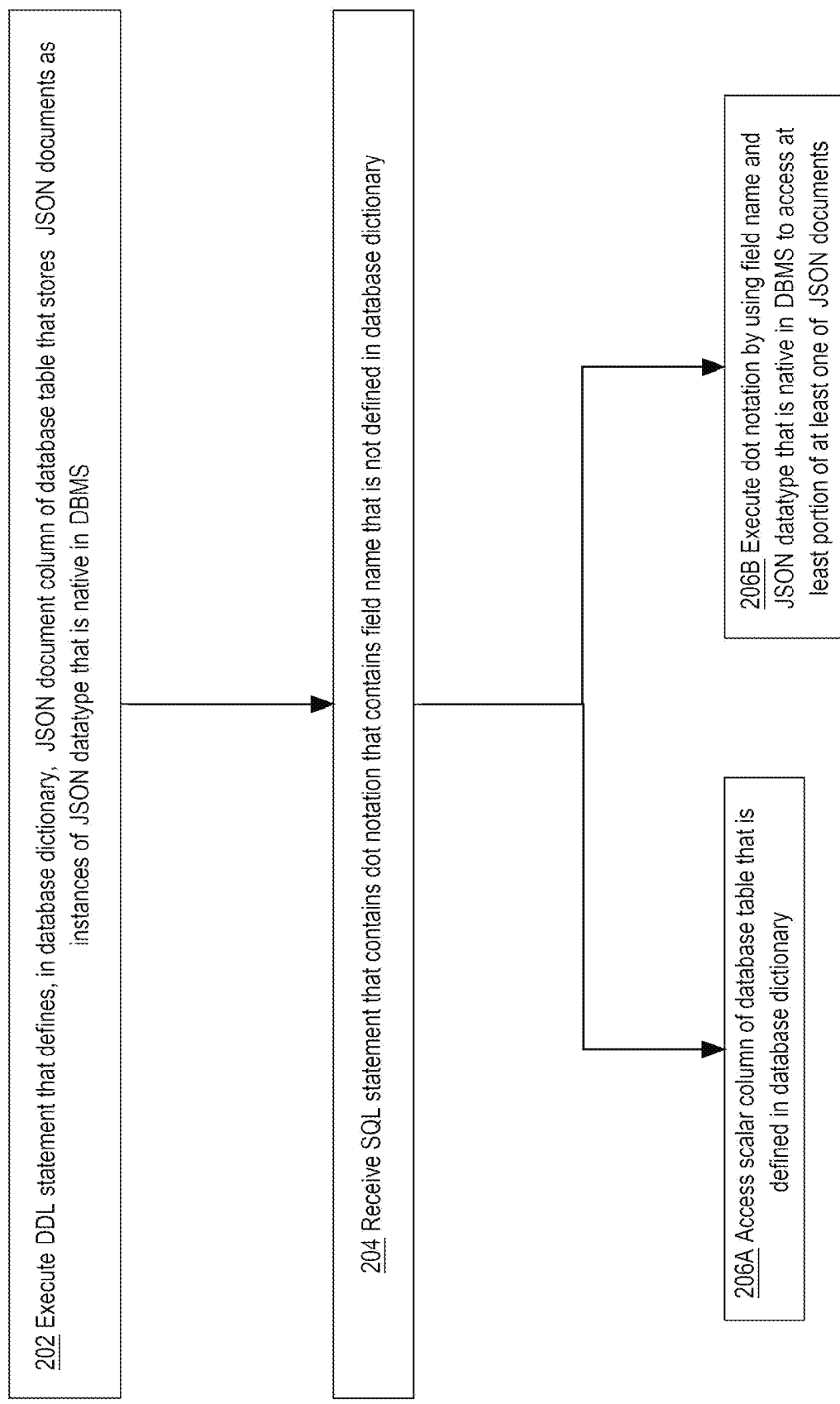
FIG. 2 is a flow diagram that depicts an example index access process for using dot notation to operate a JSON document column and a JSON datatype that is native to the DBMS.

FIG. 2 is a flow diagram that depicts DBMS 100 using dot notation to operate a JSON document column and a JSON datatype that is native to DBMS 100, in an embodiment. FIG. 2 is discussed with reference to FIG. 1.

Step 202 is preparatory and occurs during time T1. In step 202, DBMS 100 executes DDL statement 110, such as an ALTER or CREATE statement, to define, in database dictionary 120, JSON document column 142 in database table 130. DDL statement 110 specifies using JSON datatype 160 for JSON document column 142, which may be initially empty (i.e. no JSON documents) or populated with a default JSON document, which may be implied or expressly specified by DDL statement 110.

Between steps 202 and 204, JSON documents such as JSON documents 151-153 may be added into JSON document column 142 as instances of JSON datatype 160, as discussed later herein. Step 204 receives SQL statement 170 that contains dot notation 180 that contains field name 190 that is not defined in database dictionary 120.

After step 204, DBMS 100 executes SQL statement 170 at time T2, which entails both of steps 206A-B that may occur concurrently or sequentially in any ordering. Step 206A accesses scalar column 141 that is defined in database dictionary 120. For example, SQL statement 170 may contain the name of scalar column 141, which a query planner may use as a lookup key to retrieve from database dictionary 120 a definition of scalar column 141, such as to discover what is the datatype of scalar column 141.

In one example, step 206A filters rows of database table 130 based on values in scalar column 141. Thus as shown, JSON documents 152-153 are relevant to SQL statement 170, but JSON document 151 is not, such as when JSON document 151 is the only document that does not contain "2020" as a text string. In another example, step 206A uses scalar column 141 for projection, such as when scalar column 141 contributes values to a result set for SQL statement 170.

Step 206B executes dot notation 180 by using field name 190 and JSON datatype 160 to access at least portion(s) of at least one of JSON documents 151-153. Because JSON documents 151-153 may be schema-less, step 206B need not use database dictionary 120, such as for interpreting field name 190 or any other part of dot notation 180.

In one example, step 206B filters rows of database table 130 based on field values inside JSON documents 151-153. Thus as shown, JSON documents 152-153 are relevant to SQL statement 170, but JSON document 151 is not. In another example, dot notation 180 instead filters portions of JSON document(s). For example, JSON document 152 may contain an array of elements, but only some of those elements contain a JSON field with name 190. In another example, dot notation 180 is used for projection, such as when a JSON field with name 190 in relevant JSON documents 152-153 contributes values and/or JSON document fragments to a result set for SQL statement 170.

3.0 Example JSON Document Index

FIG. 3 is a block diagram that depicts an example database table 300, in an embodiment. Database table 300 uses a virtual column of a database table to access an autonomous index of JSON documents stored in the database table. Database table 300 is hosted by a DBMS such as DBMS 100.

Within the DBMS (not shown), database table 300 operates as both a physical collection of bulk data, shown as storage 306, and a logical collection of semantically defined database objects, shown as logical 308. For example in logical 308, database table 300 is composed of table rows (e.g. 310-319) and table columns (e.g. 331-332). Whereas in storage 306, database table 300 is composed of bulk data units (e.g. 341-342) that are physically stored on disk (not shown) and/or in memory 304. In an embodiment, memory 304 comprises dynamic random access memory (DRAM) that is volatile and faster than disk.

The DBMS persists data on disk as persistence data units 342 that include database blocks 371-375 that contain row major data (i.e. table rows 310-319) of database table 300. On disk, database blocks 371-375 durably contain JSON documents 350-359 of JSON document column 331 and content of other durable columns (not shown) of database table 300.

For example, database block 371 persists table rows 310-311, respectively including JSON documents 350-351 stored as instances of the binary JSON datatype that is native to the DBMS. As shown, database block 371 does not reside in memory 304. Thus, table rows 310-311 and JSON documents 350-351 do not reside in memory 304 as shown.

In addition to residing on disk, database blocks 372-375, table rows 312-319, and JSON documents 352-359 reside in memory 304 as shown. Within memory 304 and as shown, database blocks 372-375 reside in buffer cache 302 that can transfer database block(s) to/from disk. Thus, table rows 312-321, and JSON documents 352-359 reside in buffer cache 302 as shown. In this example, buffer cache 302 has an eviction policy such as least recently used (LRU).

When operating conditions are sufficient, such as according to free memory capacity and data usage patterns, the DBMS may autonomously generate an in memory columnar unit (IMCU) based on content of one or more database blocks in buffer cache 302. IMCUs 381-382 reside in memory 304, but not in buffer cache 302 because the format of an IMCU is not the same as a database block. Volatile data units 341, including IMCUs 381-382, need not be persisted to disk.

In an embodiment, volatile data units 341 operates as an LRU cache that is separate from buffer cache 302. In an embodiment, the size of a cache for volatile data units 341 may grow when free memory is plentiful and shrink when free memory is scarce.

An IMCU may store content, including JSON documents, from database block(s). IMCU 381 is generated from a single database block 373. IMCU 382 is generated from multiple database blocks 374-375. Because the binary JSON datatype that is native to the DBMS is used in database blocks and IMCUs, each JSON document 354-355 may be individually directly copied from database block 373 into IMCU 381.

Depending on the scenario, lifespans of an IMCU and a cached database block may be somewhat coupled and/or somewhat decoupled. IMCU generation may occur while loading database block(s) into buffer cache 302, or may be deferred, such as according to autonomous decisions.

In one example as shown, database block 372 is cached but still has no IMCU, which may be generated later so long as database block 372 remains cached. In another example, database block 372 remains cached, even after its IMCU is discarded as shown.

In one example as shown, database block 371 and its IMCU are both evicted from memory 304 at a same time. In another example not shown, an IMCU is not discarded when its database block is evicted from buffer cache 302.

An IMCU may store metadata that database blocks do not store. IMCU internal metadata may provide compression, such as an encoding dictionary (not shown), or may provide acceleration, such as JSON content indices 391-392 that respectively reside in IMCUs 381-382 as shown. Such an index is generated when its IMCU is generated. For example as shown, index 391 may accelerate accessing JSON documents 354-355 within IMCU 381. Although not shown, an IMCU may contain multiple indices of different kinds for all of the IMCU's JSON documents, or for different (e.g. disjoint or not) subsets of JSON documents in the IMCU. For example, different subsets of JSON documents may correspond to different filter expressions, such as dot notation filters, such as from most frequent SQL statements.

In an embodiment, an IMCU may be an in memory expression unit (IMEU) that stores results of an evaluated expression, such as from a SQL statement, so that the expression results only have to be calculated once, not each time they are accessed. An IMEU can be scanned, filtered, and indexed in similar ways to those of an IMCU. For example, processing of IMEUs and other IMCUs may entail single instruction multiple data (SIMD) vector processing. In an embodiment, IMCU 381 is an IMEU for an expression and index 391 is a path and value index that indicates which of JSON documents 354-355 or locations or portions within JSON documents 354-355 satisfy the expression.

Depending on the embodiment, index 391 may be an instance of various kinds of document indices. In one example, index 391 does not depend on content of JSON documents 354-355. For example, IMCU 381 may contain a vector that contains JSON documents 354-355.

In that case, index 391 may be an identifier map that maps offsets of documents in that vector to identifiers of JSON documents 354-355 or identifiers of table rows 314-315. For example, the identifier map may itself be a vector of identifiers. The identifier vector and the JSON document vector may have parallel offsets, such that if a JSON document's offset into the JSON document vector is known, then that offset can be used in the identifier vector to find the identifier of the table row that stores that JSON document.

Index 391 may be an instance of a kind that depends on content within JSON documents 354-355. For example, index 391 may be a posting index that combines a dictionary with a posting list. A dictionary contains key-value pairs and operates as a lookup table. Dictionary keys are distinct JSON tokens that occur in JSON documents 354-355. A dictionary value is a posting list for a dictionary key (i.e. JSON token).

For example, JSON document 354 may be tokenized into a sequence of tokens that excludes some characters such as JSON whitespace, JSON separators such as commas and colons, quotes around JSON string literals, and closing (but not opening) braces and brackets. JSON fields are enclosed within matching braces for a JSON object. A JSON array's elements are enclosed within matching brackets. For example, JSON document 354 may be:

```
{ "nickname" : "Joe Lunchbox" ,
    "colors" : [ "green" , "light green" ] }
```

Thus, JSON document 354 has a sequence A of nine tokens at nine offsets:
1. {
2. nickname
3. Joe
4. Lunchbox
5. colors
6. [
7. green
8. light
9. green For example, green occurs at offsets 7 and 9 in JSON document 354, but green may occur at different (e.g. more, fewer) offsets in other JSON documents.

The dictionary keys exclude braces, brackets, and duplicates. Thus, JSON document 354 has only six distinct keys. A posting list indicates which token offsets into which JSON documents 354-355 contain a same JSON token (i.e. the dictionary key). For example, JSON document 355 may be:

```
{ "friend" : { "nickname" : "friendly" } ,
    "nickname" : "unknown" }
```

Thus when the dictionary key is nickname, the dictionary value is posting list B that contains entries 0-1 respectively for JSON documents 354-355:
0. 2-4
1. 4-5, 6-7

Posting list B is interpreted as follows. IMCU has a vector that contains JSON documents 354-355 at respective offsets 0-1, which are also offsets into posting list B. Entry 0 indicates that JSON document 354 contains field nickname that spans tokens 2-4, which are nickname, Joe, and Lunchbox. Entry 1 indicates that JSON document 355 contains field nickname twice, at tokens 4-5 and tokens 6-7.

To detect which of JSON documents 354-355 match nickname="Joe Lunchbox" as dot notation, posting list B is used. Only the 2-4 token range in entry 0 for JSON document 354 matches because token 2 is field nickname and tokens 3-4 are Joe Lunchbox.

The posting index may also indicate which keys are field names and which keys occur in field values. For example, "color": "color unknown", may contribute two separate keys that are a color name key that spans three tokens and a color value key that spans only one token.

An element count of a JSON array occurs in a dot notation such as COUNT(colors), such as for the colors array in JSON documents 354. Above is sequence A that indicates that JSON document 354 has a colors array, but neither sequence A nor a posting list (not shown) for colors as a dictionary key indicates that the colors array has exactly two elements: green and light green. The posting list would only indicate that the colors array value has three tokens, which does not suggest two array elements.

A child mapping index is a vector whose length is a count of JSON children of a JSON object, such as a JSON array. Each vector element may identify a token offset of a child. For example in sequence A above, tokens 7, 8, 9 respectively are green, light, green. The child mapping index's offset vector for the colors array of JSON document 354 should contain only offsets 7-8 that respectively indicate green and light green, which are exactly the two elements of the colors array.

A posting index may be used to quickly detect which JSON documents in an IMCU contain a particular JSON field or contain a particular word in a JSON value. Depending on its kind, index 391 may be: a forward index that maps JSON document identifiers to content items (e.g. words, element names), or an inverted (a.k.a. postings) index that maps content items to JSON document identifiers and/or locations within JSON documents as explained above.

Various kinds of index 391 may accelerate: navigation to a particular substructure (e.g. array) or element within JSON document(s), and/or retrieval of particular fragment(s) of JSON document(s) such as an element or array. Index 391 may accelerate calculations such as counting elements in an array or deriving statistics (e.g. of an array) such as a minimum, maximum, or mean.

Likewise, an OSON document itself contains a dictionary of field names. For example, JSON document column 331 may store OSON documents, and JSON documents 350-359 may be OSON documents. Thus, even without an IMCU and its index, the DBMS can detect whether or not JSON document 352 in buffer cache 302 contains a particular named field without scanning much of JSON document 352.

In an example not shown, IMCU 381 contains a separate index, such as 391, for each of JSON documents 354-355. That is, each of JSON documents 354-355 has its own index in IMCU 381. Likewise, each of JSON documents 354-355 has its own instance of the binary (e.g. OSON) native JSON datatype in IMCU 381.

The field dictionary of OSON can be directly copied from JSON document 354 to generate a posting index in IMCU 381 for JSON document 354. Only in this case, index 391, or at least part of it, actually is persistent, because it is also part of OSON. That has implications for modifying JSON document 354 as discussed later herein.

Various kinds of index 391 may be used to randomly access a particular named field in JSON document 354 without scanning on demand the content of JSON document 354. Advanced approaches for implementing and operating an IMCU for JSON, such as bitmap operations for compound query predicates, and IMCU internals, such as a delta posting index or a hashed posting index, are presented in U.S. patent application Ser. No. 16/022,465, Techniques for Enabling and Integrating In-Memory Semi-Structured Data and Text Document Searches with In-Memory Columnar Query Processing.

Similarly some, but not all, binary JSON document formats may accelerate internal navigation (e.g. random access) within a JSON document as follows. For example, MongoDB's BSON binary document format, like text JSON, is a stream format potentially requiring that much of a document be read to resolve a JSON path or, in a worst case requiring scanning the entire document, to determine that the path is absent in the document. OSON facilitates: a) jumping (i.e. random access) quickly to named fields and array locations in a JSON document, and b) detecting presence or absence of a path in a JSON document without even scanning much of the JSON document, including not scanning the portion of the JSON document that contains the path. In other words, OSON can provide increased performance and functionality of a DOM before a whole DOM is received, which is beyond the capability of a state of the art DOM.

In an embodiment as shown and unlike ordinary table indices of the DBMS, JSON indices 391-392 for same JSON document column 331 may be integrated into the DBMS as virtual column 332 as shown. Virtual column 332 is not actually persisted and instead uses IMCUs 381-382 as a backing store that provides indices 391-392 as content for virtual column 332.

Virtual column 332 is materialized, to the extent that only some table rows 314-319 currently have indices. The DBMS may request an index from virtual column 332 by identifying a table row. For example, specifying table row 314 causes virtual column 332 to return index 391. Whereas, specifying table row 313 causes virtual column 332 to return no index, because table row 313 does not reside in an IMCU, even though table row 313 does reside in buffer cache 302. In an embodiment and because the lifecycle and availability of indices 391-392 may be unpredictable to clients, virtual column 332 may be a hidden column, which may cause indices 391-392 and virtual column 332 to be invisible or otherwise inaccessible to clients.

The DBMS is internally scalable beyond what is shown. For example, the DBMS may have other table(s) that also have a JSON document column and a virtual column. Database table 300 may have multiple JSON document columns, each having its own virtual column.

4.0 Example Index Access Process

Figure 4:
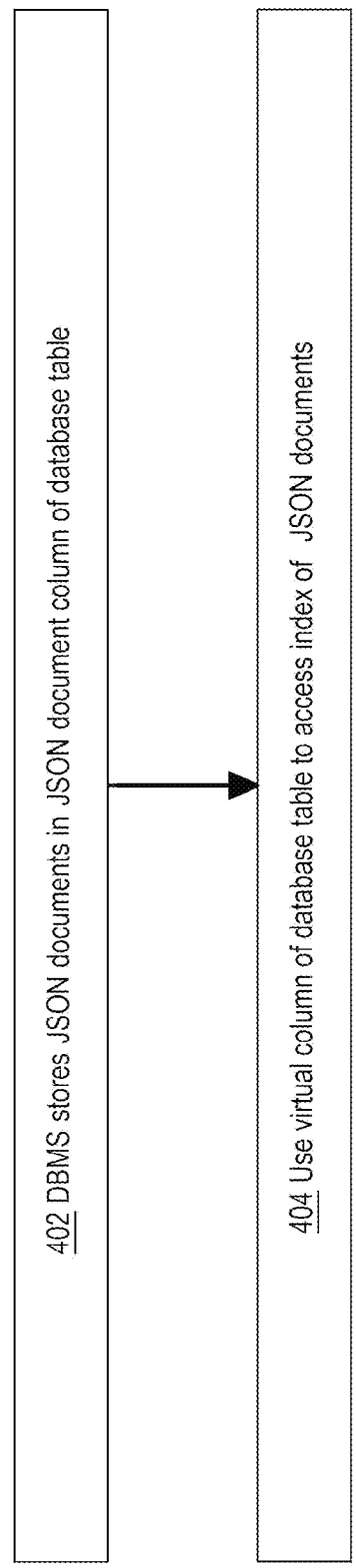
FIG. 4 is a flow diagram that depicts an example index access process for using a virtual column of a database table to access an index of JSON documents stored in the database table.

FIG. 4 is a flow diagram that depicts the DBMS using a virtual column of a database table to access an index of JSON documents stored in database table 300, in an embodiment. FIG. 4 is discussed with reference to FIG. 3.

In step 402, the DBMS stores at least JSON documents 350-359 into JSON document column 331. For example, a client may send JSON documents 350-359 to the DBMS, which may append a table row into database table 300 for each of JSON documents 350-359. Each such table row may store a respective one of JSON documents 350-359 into JSON document column 331. All of those activities of step 402 may occur solely with JSON documents 350-359 being instances of the binary native JSON datatype and without ever encountering JSON documents that are raw text.

Between steps 402 and 404, some workload may be processed, which autonomously fills buffer cache 302 with database blocks 372-375. The workload also autonomously generates IMCUs 381-382 and their respective indices 391-392. Again, only the binary native JSON datatype is needed for JSON documents. Eventually, a SQL statement is received that refers to JSON document column 331. The execution of that SQL statement includes step 404.

In step 404, virtual column 332 is used to access one, some, or all of indices in volatile data units 341. For example, a full scan of JSON document column 331 for all JSON documents containing a particular field may entail the following (e.g. concurrent) activities.

As explained earlier herein, JSON document column 331 may store OSON documents, and JSON documents 350-359 may be OSON documents. For example, database block 371 is the only one that must be fetched from disk (e.g. into buffer cache 302), and the field dictionary of each JSON document 350-351 is searched for the sought field name, which entails inspecting metadata within OSON, but not scanning OSON content. Database block 372 already resides in buffer cache 302, but otherwise is processed similar to database block 371. Database blocks 373-375 are not accessed during step 404, because (e.g. posting) indices 391-392 in respective IMCUs 381-382 are used instead.

5.0 JSON Document Indexing Process

Figure 5:
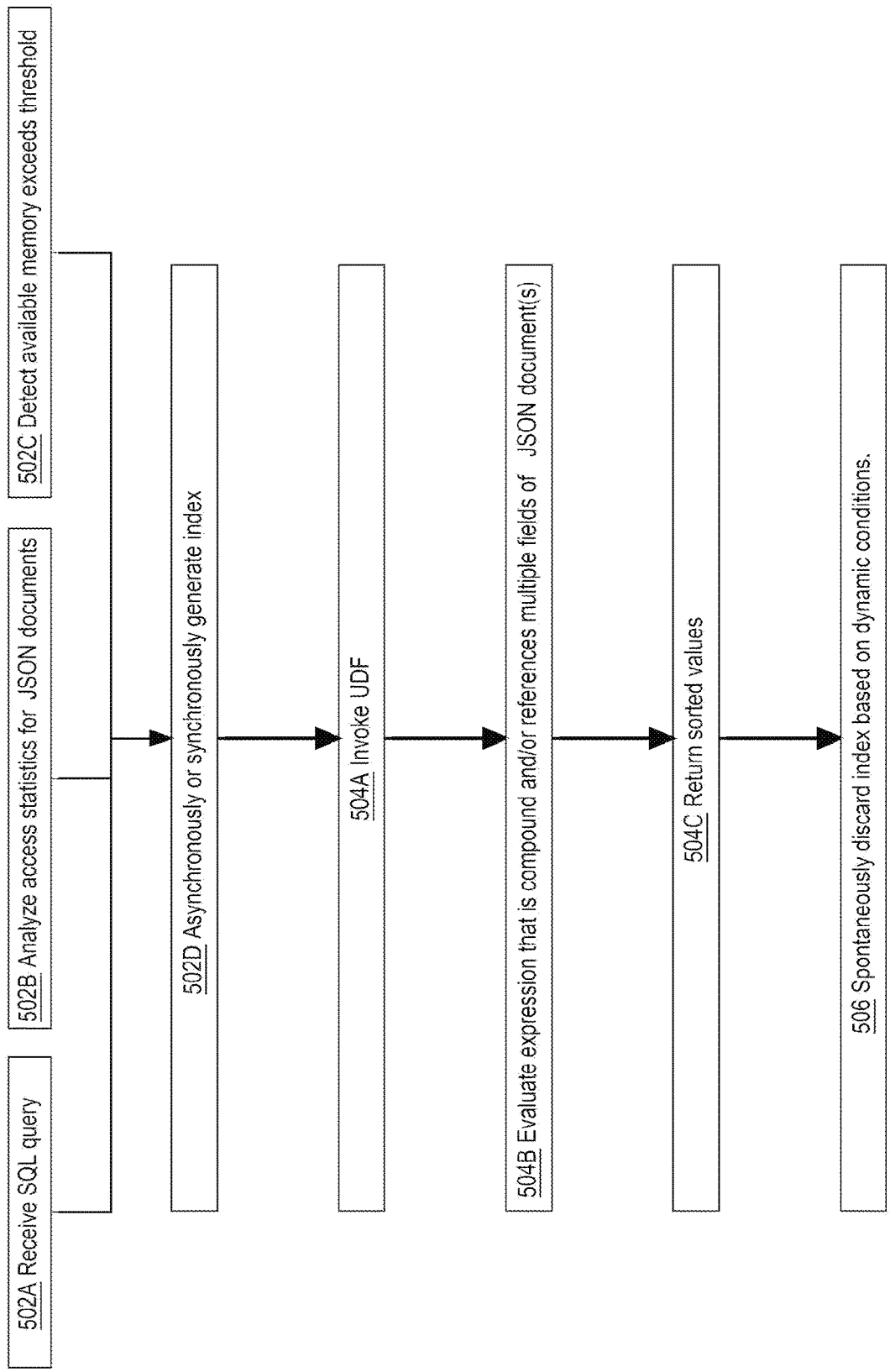
FIG. 5 is a flow diagram that depicts an example process for generating and using an index of JSON documents in various complementary ways.

FIG. 5 is a flow diagram that depicts the DBMS of database table 300 generating and using an index of JSON documents in various complementary ways, in an embodiment. FIG. 5 is discussed with reference to FIG. 3.

Steps 502A-C entail various conditions that may cause generating index 391. Step 502A causes generating index 391 in response to receiving a SQL statement. For example, parsing, semantic analyzing, or planning for execution of the SQL statement may cause generation of IMCU 381 and index 391 for JSON documents 354-355.

Step 502B causes generating index 391 based on access statistics for JSON documents 354-355. For example, generation of IMCU 381 and index 391 may be conditioned upon JSON documents 354-355 being frequently and/or recently accessed. In some cases, content of index 391 may depend on access statistics. For example, which of JSON documents 354-355 and/or which portions of them are covered by index 391 may depend on frequency or recency of access of those JSON documents individually and/or access of their portions.

Step 502C causes generating index 391 when available memory of the DBMS exceeds a threshold. In an example not shown when sufficient spare memory is lacking, IMCU 381 and index 391 need not be generated. Likewise when sufficient memory is later freed, deferred generation of IMCU 381 and index 391 may occur.

Step 502D synchronously or asynchronously generates index 391, which may occur in various scenarios. For example according to schedule and/or dynamic conditions, the DBMS may decide to generate index 391, such as when index 391 is autonomous. For example, the DBMS may synchronously or asynchronously decide to generate index 391, but then defers such generation until later, such as according to schedule, workload, or with a (e.g. low priority or single threaded) backlog queue. In examples not involving deferral, asynchrony of generating may arise by generating index 391 in the background, such as with a thread or processor core that is separate from processing of a current SQL statement that instigates the generating. In that case, asynchrony entails concurrency. Foreground generation of index 391 is synchronous, such as within the call path of execution of a query that uses index 391.

Subsequent use of index 391 is the reason to generate index 391. Steps 504A-C perform various complementary activities that are associated with using index 391.

Index 391 may be available for repeated and/or concurrent use. Likewise, generation and use of index 391 may be decoupled. For example, one SQL statement may cause generation of index 391 without use, and a subsequent SQL statement may eventually use index 391 that is already generated.

For example, background generation of index 391 may still be ongoing such that the first SQL statement finishes executing before index 391 is ready to use. In an embodiment, execution of the first SQL statement initially proceeds without using index 391, and if background generation of index 391 finishes while the first SQL statement is still running, then the first SQL statement may dynamically switch to using index 391. For example, some rows of a result set for the first SQL statement may be generated without using index 391, and other similar rows of the same result set may instead be generated next by using index 391.

Step 504A invokes a user defined function (UDF). For example, index 391 may group JSON documents or JSON document fragments according to a custom hash function that is provided as a UDF. The UDF may be used during generation and use of index 391.

Step 504B evaluates an expression that is compound and/or references multiple fields of JSON document(s). For example, index 391 may be based on a filtration expression that occurs in one or different SQL statements. That filtration expression may have multiple terms and operators, such as with a value range filter of a single field, or with a filter that regards a compound key or other multiple fields.

Index 391 may be forward or inverted, both of which map a key to value(s), although semantics of key and values are reversed based on index 391 being forward or inverted. In any case, index 391 may store keys as sorted or store a key's mapped values as sorted, with sorting latency during index generation or updating being a cost that may be amortized across (e.g. many) repeated uses of index 391. Thus when used, index 391 may immediately return already sorted values, shown as step 504C.

For example, finding a particular value in the returned sorted values may be accelerated by binary search or linear search. For example when index 391 reports that JSON document 331 contains alphabetically sorted color field values of blue, green, and red, then subsequent detection that the first returned value is blue is sufficient to infer that JSON document 331 does not have a color field value of azure, which would have alphabetically occurred before blue but did not.

Step 506 autonomously discards index 391 based on dynamic conditions. Conditions such as: a) high memory demand, b) eviction (e.g. of an IMCU) from cache of some or all JSON documents covered by index 391, c) SQL statement execution completion, d) index staleness due to JSON document creation or updating, d) or idleness of index 391, may cause the DBMS to autonomously discard index 391. Because some conditions are antagonistic, such as high demand for both of memory and in-memory index 391, the DBMS may have intelligently designed thresholds and heuristics to balance competing forces.

Autonomous index history may influence autonomous index administration. For example when index 391 is frequently discarded and more or less identically and repeatedly recreated, automatic history analysis may suggest pinning index 391 in memory, such as by indefinite or temporary exemption from eviction decisions. In an embodiment, the DBMS delegates some or all autonomous index decisions to a rules engine, such as for flexible and/or sophisticated administration. For example, patching or tuning a ruleset may be less cumbersome than patching the DBMS, and/or the DBMS may need and lack sufficient manual tuning configurability for optimal autonomous indexing without rules.

6.0 JSON Document Storage

FIG. 6 is a block diagram that depicts an example DBMS 600 that efficiently arranges data structures in storage such as memory and/or disk, in an embodiment. DBMS 600 may be an implementation of DBMS 100.

JSON document column 612 or row subset(s) thereof may each have index(es) of various kinds. For example, index 630 indexes a subset of rows of JSON document column 612 that includes JSON documents 622-623, but not JSON document 621 in same JSON document column 612 For example, index 630 may be a path and value index or a raw text index as presented herein. Index 630 may be forward or inverted, both of which map a key to value(s), and both of which may have increased density when multiple values are encoded into a bitmap. Thus, index 630 may map a key to a bitmap, which may or may not exceed a density of multiple dictionary encoded values for a same key, depending on the amount of possible values indexed and the average amount of actual values per key. For example if index 630 is autonomous as explained earlier herein, then index 630 may be spontaneously replaced with an index of bitmaps or an index of dictionary codes.

DBMS 600 may have table columns that store large (e.g. tens of megabytes) objects (LOBs), such as with LOB column 613, that may be a character LOB (CLOB) or a binary LOB (BLOB). In an embodiment, JSON document column 612 stores values of a JSON datatype that is a variant of a LOB type. For example in some lower implementation layers in DBMS 600, table columns 612-613 may have more or less indistinguishable datatypes, such that both columns may be processed in a same way. Whereas, at higher implementation layers in DBMS 600, where semantics are important, table columns 612-613 may be processed differently because only JSON document column 612 entails a native JSON datatype. In an embodiment, the JSON datatype is a variant of a LOB type, but many or nearly all LOB operations are forbidden to clients on the JSON datatype.

Most datatypes of DBMS 600 may have a respective fixed size (i.e. width), such as scalars. In some cases, scalar width may be naturally or conventionally fixed, such as according to an industry standard such as IEEE for real numbers. In other cases, an application may impose a fixed width of a data field. For example, a Boolean may need one byte or one bit, and strings and numbers may have widths designated by an application.

Some datatypes have a naturally variable width, such as more or less unbounded text strings and LOBs. A variable width field may be variously configured to store data in ways such as: in line within a record (i.e. table row) such as in database block 670, out of line in a different database block, or externally such as in a file. For in-lining, a variable width field may have a default width, which may waste some space but achieve some acceleration due to data locality. Storage of LOBs and other fields, in and out of line, is detailed in related U.S. patent application Ser. No. 16/863,268, Technique of Supporting Piecewise Update of JSON Document Efficiently.

In line columns have either a fixed width or a default width. For example, a table (not shown) may have multiple columns, such as 612-613, having respective default widths. For example, variable width columns 612-613 have respective default widths A-B as shown. Virtual columns (e.g. 611) do not need default widths and do not contribute to the sum of default widths of columns of a table. In an embodiment, variable width columns have default widths. In an embodiment, a table may have a default row width instead of or in addition to default column width(s).

Widths of columns and rows may affect efficiency in various ways, including density (i.e. spatial locality) and thrashing (i.e. input/output, I/O) of cache(s) and/or virtual memory. For example, an actual value of a field that exceeds a default width of the field's column may cause overflow. In another example, the default width of row 660 may be exceeded, such that row 660 overflows.

In any case, overflow may be accommodated with row chaining, such that values data may spill over into another row, such that a logical row is more or less a concatenation of multiple physical rows. In a best case, the multiple physical rows are contiguous and are contained in a same database block 670. In a worst case, a logical row spans multiple non-adjacent database blocks.

Thus, setting default widths may affect efficiency, which may be improved with intelligent heuristics such as follows. In an embodiment, default width A of JSON document column 612 is greater than default width B of LOB column 613. In an embodiment, default width A of JSON document column 612 is less than a size of database block 670. Sizes/widths may be measured in bytes or multiples of bytes, such as kilobytes.

In an embodiment, DBMS 600 automatically decides: a) a default width of JSON document column 612, b) whether or not JSON document column 612 (or a particular one of its JSON documents) is in lined or not, such as according to a threshold size, and/or c) when to adjust default widths. Such decisions may be autonomous and depend on various dynamic conditions discussed elsewhere herein.

In an embodiment, DBMS 600 has a storage area network (SAN) (not shown) composed of intelligent storage computers, such as Oracle Exadata, to which some database operations may be offloaded. For example on behalf of DBMS 600, a storage computer may apply filtration criteria during a table scan, such as a smart scan. For example, the smart scan may return only database blocks that contain row(s) or JSON document(s) or JSON document fragment(s) that satisfy the filtration criteria. Thus, DBMS 600 may retrieve and process fewer blocks to accomplish a full scan. In an embodiment, a default width or in line threshold size may reflect block or buffer sizes of: the storage computer, DBMS 600, and/or the computer hosting DBMS 600. A smart scan that offloads query operations from a DBMS is presented in U.S. Pat. No. 10,296,462, Method To Accelerate Queries Using Dynamically Generated Alternate Data Formats In Flash Cache.

In an embodiment, DBMS 600 contains a multi-instance (i.e. distributed) database. With multiple database servers and/or multiple storage computers such as with an Exadata SAN, stored JSON documents may be distributed and/or replicated. For example, a database table that contains JSON document column 612 may have its table rows partitioned into shards (i.e. subsets of rows), and each shard may be a unit of bulk data distribution. For example, JSON documents 621-624 need not be durably stored and/or subsequently manipulated on a same computer.

OSON internal metadata as described elsewhere herein and/or index 630 such as a path and value index may accelerate value-based partition assignment such as by hashing. In an embodiment some or all database operators can exploit shards. For example, a global search for JSON documents that contain a given phrase may be dispatched as a respective local search to each shard computer, and local results from the shards may be (e.g. centrally) combined to generate global results.

7.0 Example JSON Document Storage Process

Figure 7:
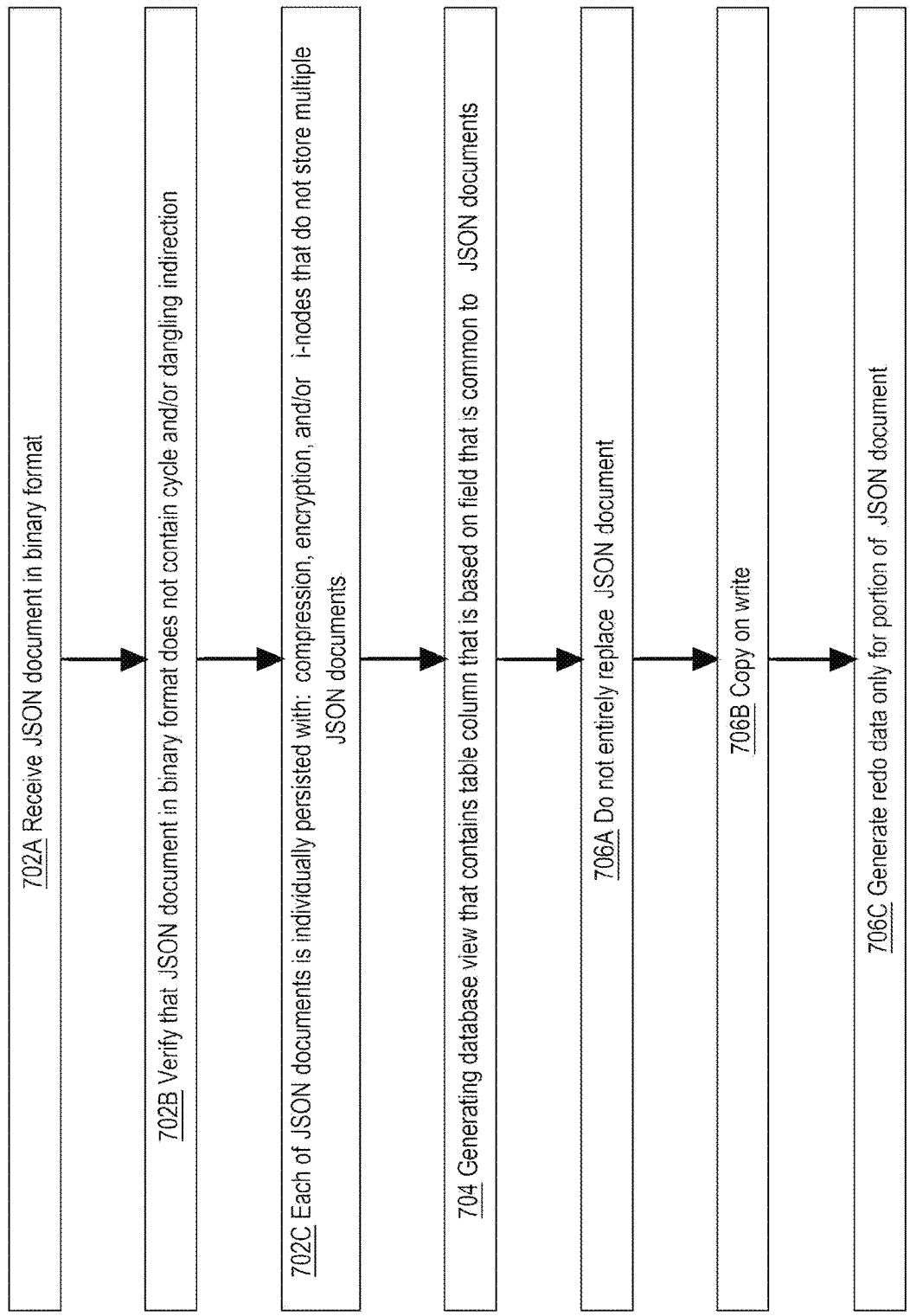
FIG. 7 is a flow diagram that depicts an example JSON document storage process for populating and modifying a JSON document datastore.

FIG. 7 is a flow diagram that depicts populating and modifying a JSON document database, in an embodiment. FIG. 7 is discussed with reference to FIG. 6.

FIG. 7 presents preparation and modification of a JSON document database as two independent use cases. Each use case shows various complementary activities. Thus any activities in a use case, which are shown as separate steps, may be combined into a single step that combines techniques to fulfil the use case. Thus, while each of the steps shown in a use case may be individually capable of fulfilling the use case, when steps are combined, still only one occurrence of the use case is fulfilled.

To pursue both use cases or multiple occurrences of a same use case, a same or different combination of shown steps may be repeated. As shown, the first use case entails JSON document storage in steps 702A-C, and the second use case entails JSON document modification in steps 706A-C. As a complicated example scenario, DBMS 600 may store some JSON documents, then modify some JSON documents, and then store some more JSON documents, in rapid succession or with much querying occurring between use cases.

Populating DBMS 600 with JSON documents may entail one, some, or all of steps 702A-C, variously for each JSON document. In an embodiment, JSON documents are received individually or in bulk as sparse text or, as shown in step 702A, in a dense binary format such as OSON as discussed earlier herein. JSON document integrity need not be presumed, especially if JSON documents come from an untrusted or experimental source or a client in the wild, such as an uncontrolled external environment where client identity or client agent software can be spoofed (i.e. intentionally misrepresented perhaps maliciously).

Step 702B integrity checks a received JSON document, the manner of which may depend on document encoding. A text document should be well formed, such as with matched pairs of delimiter characters and/or tags. A binary JSON document should have referential integrity, such as forbidding cycles and/or dangling pointers.

For example, internal indirection specified within a binary JSON document may treat the JSON document as an array of bytes or elements that can be addressed by offset. A dangling (i.e. non-existent) offset or, depending on the implementation, a backward or forward offset (i.e. suggesting a cycle) may be forbidden. Other integrity checks may entail character set enforcement, proper character escaping, encoding dictionary validity, and such.

There may be two intensities of verification, without always needing to perform both. For example, less verification may entail ensuring that a JSON document will not crash DBMS 600. Heavier verification may ensure that a JSON document conforms to additional expectations, such as application specific requirements, or string literal character validation.

For example, step 702B may apply less verification, with other verification occurring during querying, which may cause some queries of bad JSON document(s) to abort entirely or have incomplete results. Metadata may flag which JSON documents have already passed which verification(s) to avoid redundant verification. Some implementation layers of DBMS 600 may be guaranteed to operate only with JSON documents that were sufficiently verified by other layer(s).

Step 702C effectively ensures that each JSON document is individually persisted in various ways, even if JSON documents are actually persisted in bulk. For example, each JSON document may be individually (e.g. dictionary) compressed and/or encrypted. Concurrency of subsequent reads and/or writes (e.g. by different clients) of different JSON documents may be facilitated by providing each JSON document with its own i-nodes in a disk filesystem, such that no i-node is shared by multiple JSON documents.

Either before or after storing JSON documents, step 704 generates a database view that synthesizes table column(s) from field(s) of JSON document(s). For example, elements of JSON documents may be logically shredded into columns of a tabular database view. For example, JSON documents with a color field may contribute values to a color column of a view.

The database view may be materialized, non-materialized, and/or refreshable: expressly by client command, or automatically at transaction boundaries. From the stored JSON documents, a strongly typed tabular schema for JSON document fields may be automatically inferred and used to generate the database view, such as with data guide technology. An example of a data guide is described in U.S. Pat. No. 9,864,816, Dynamically Updating Data Guide for JSON documents.

Schema inference may be based on all content of all JSON documents in a same JSON document column, which may change whenever a JSON document is added, removed, or modified. Thus, a JSON document column's inferred schema may evolve. Thus, the database view's definition may be automatically and dynamically altered, in an embodiment.

Selectively modifying portions of JSON document(s) may entail one, some, or all of steps 706A-C, variously for each JSON document. For example, step 706A can modify a portion of a JSON document without replacing the whole JSON document. Such modification may be in or out of place. For example, there might not be enough room to overwrite a short string value with a long string in place. Likewise, all updates are out of place for a write-once datastore. Out of place writing may be facilitated by a copy on write operation, shown as step 706B.

For example, OSON's tree model (i.e. DOM) provides native tree offset based jump navigation such as for partial update of physical OSON bytes. Furthermore, an OSON partial update requires only a standard UNIX/POSIX file system application programing interface (API) that is able to: a) seek to an offset within a file for byte-length preserved content replacement, and/or b) append bytes to the end of a growing file. OSON modification does not require the underlying file system to delete bytes in the middle of a file to cause holes or insert extra bytes into the middle of the file to cause interior growth.

Redo logging facilitates various scenarios such as replication. Naïve redo logging may unnecessarily reflect whole JSON documents, even when only portions were modified. Step 706C optimizes by generating redo data only for JSON document portions that were modified.

In a redo example not involving replication, OSON supports as many piecewise updates at a physical level as possible so that the redo log size is usually proportional to the actual required piecewise change of the JSON document. DBMS 600 may detect sufficient (e.g. threshold) accumulated past changes and changes from the execution of the current updating operations, so that DBMS 600 autonomously (e.g. in background) regenerates the JSON document anew by consuming and applying the redo log. JSON document modification is presented in related U.S. patent application Ser. No. 16/863,268, Technique of Supporting Piecewise Update of JSON Document Efficiently.

8.0 Aggregation Function

FIG. 8 is a block diagram that depicts an example DBMS 800, in an embodiment. DBMS 800 executes a SQL statement by applying an aggregate function to array(s) in JSON document(s). DBMS 800 may be an implementation of DBMS 100.

Within any of JSON documents 811-814 may be repetition of a field or nested substructure. For example, a JSON document may contain an array. Conventional database aggregation functions, unlike aggregation function 830, operate on sets of records, such as multiple rows or JSON documents. Whereas, aggregation function 830 innovates by operating on multiple elements (e.g. of an array) within each of relevant JSON document(s), such as JSON documents 812-813 as shown.

For example, JSON documents 811-814 may be purchase orders. Only purchase orders 812-813 that already shipped may be relevant to a SQL statement that seeks a largest purchase order that already shipped and contains the most line items. Thus, the SQL statement may specify aggregation function 830 as counting line items in each purchase order 812-813. Aggregation function 830 may instead specify another statistic such as maximum, minimum, mean, or sum.

For example, aggregation function 830 may be respectively applied to each of purchase order 812-813 to calculate respective counts of line items, shown as respective values A-B of aggregate values 840. Either or both of values A-B may be returned in a result set (not shown) for a SQL statement.

In an embodiment, aggregation function 830 may be elided such that aggregation function 830 may be a member (i.e. method) of an aggregate type such as an array. For example when aggregation function 830 is a summation without elision, then summation is expressed as "sum(document.numericArrayField)". Whereas with elision, then summation is instead expressed as "document.numericArrayField.sum( )".

9.0 Example Aggregation Process

Figure 9:
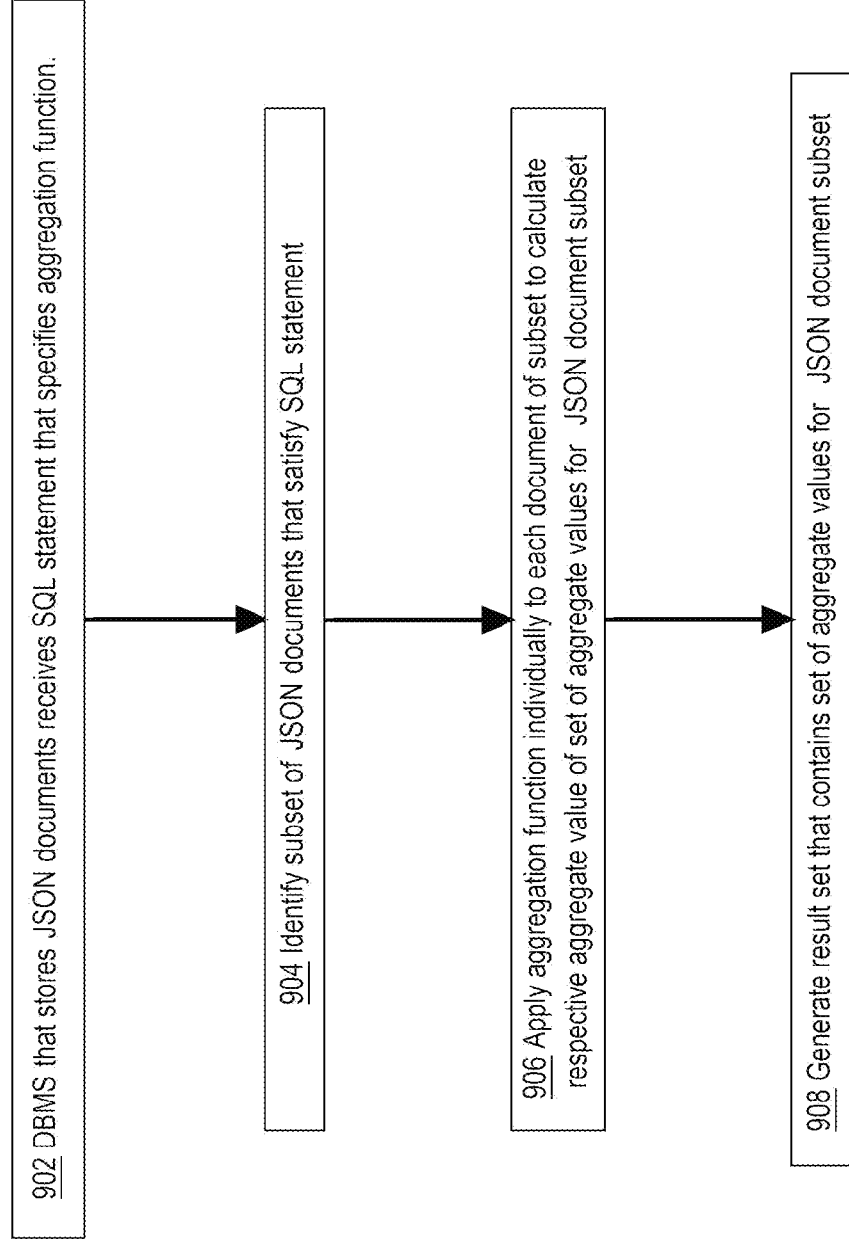
FIG. 9 is a flow diagram that depicts an example aggregation process for executing a SQL statement by applying an aggregate function to array(s) in JSON document(s)

FIG. 9 is a flow diagram that depicts DBMS 800 executing a SQL statement by applying an aggregate function to array(s) in JSON document(s), in an embodiment. FIG. 9 is discussed with reference to FIG. 8.

In step 902, DBMS 800 receives a SQL statement that specifies aggregation function 830, as discussed above. Step 904 identifies a subset of JSON documents that satisfy the SQL statement. For example as shown, only JSON documents 812-813 match filter criteria (not shown) of the SQL statement.

Step 906 applies aggregation function 830 individually to each of selected JSON documents 812-813 to calculate respective aggregate values A-B of set of aggregate values 840. For example, if each of selected JSON documents 812-813 contains a respective selected array, then aggregate function 830 is individually applied to each array to calculate respective aggregate values A-B. For example, if: a) JSON document 812's array has three elements, b) JSON document 813's array has four elements, and c) aggregation function 830 counts array elements, then values A-B are respectively three and four. Thus, aggregate values 840 would contain integer values of three and four.

Step 908 generates a result set that contains at least one value of aggregate values 840. For example, the result set may contain a first row that contains a three, and a second row that contains a four. Alternatively, the results may comprise an array that contains three and four. That array may be returned as a synthesized (i.e. temporary) JSON document or an element in a synthesized JSON document.

10.0 Example Process for Applying a Function

Figure 10:
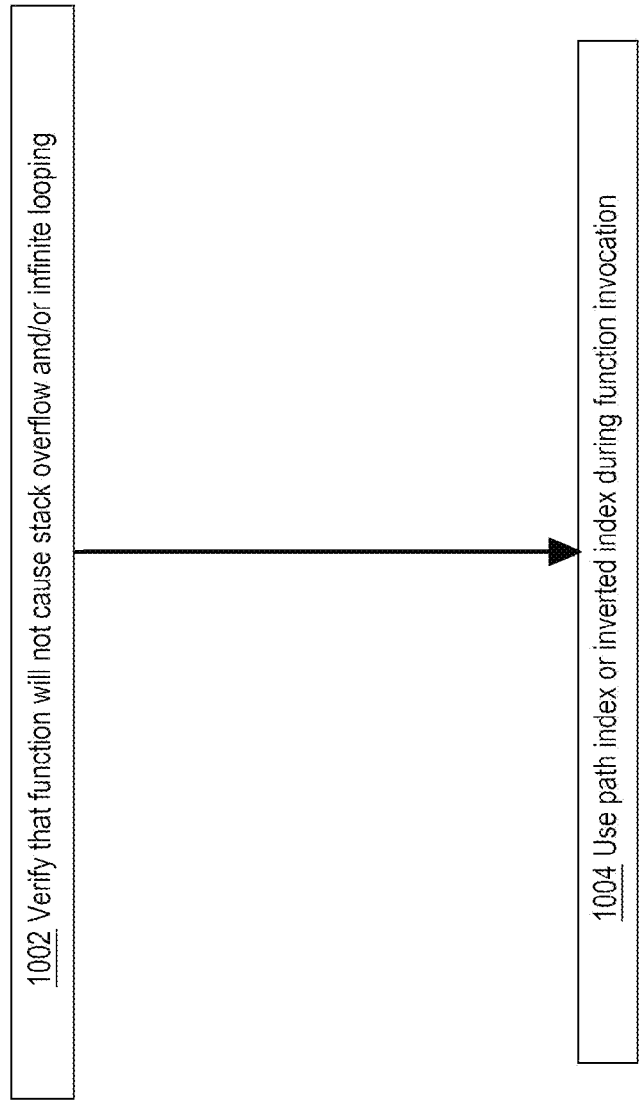
FIG. 10 is a flow diagram that depicts an example process for applying a function that is referenced in a SQL statement.

FIG. 10 is a flow diagram that depicts DBMS 800 applying a function that is referenced in a SQL statement, in an embodiment. FIG. 10 is discussed with reference to FIG. 8.

DBMS 800 may receive a SQL statement that contains call site(s) to same or different function(s). For example, a SQL expression foo(bar(1),bar(2)) has two call sites of bar and one call site of foo. Such an invocable function may be built into DBMS 800 or implemented as a UDF. The function may evaluate to a scalar or, in the case of aggregation function 830, may evaluate to an aggregate such as a set of values such as values A-B as shown.

If the function is a UDF, then its definition may contain an accidental or malicious control flow defect, which step 1002 may detect and reject such as by aborting the SQL statement. For example, step 1002 may detect that the UDF does not contain an infinite loop, which may instead be detected when the UDF is initially defined. Recursion, especially non-tail recursion, in the UDF may cause stack overflow, especially when the UDF can visit many elements, such as for: a) a graph statement or a context free statement, or b) the UDF is an aggregate function applied to a huge set of very many elements.

Step 1002 may verify that recursion cannot exceed a threshold depth, which may or may not depend on actual argument values for the UDF. For example, different call sites of a same function in a same statement may need separate validation. An embodiment may skip stack overflow verification during step 1002 and instead dynamically check stack depth while the UDF operates.

To some extent, document path depth and call stack recursion depth may be related such that they may be somewhat interchangeable concepts. Thus, merely validating one or the other depth may effectively serve as a validation of both. Thus, which of the two depths is actually validated may depend on the embodiment. For example, an embodiment may perform depth validation directly on a JSON document, perhaps without any UDF.

If the function passes verification step 1002, then the function is invoked. If the function is aggregate, such as 830, then it may be accelerated by step 1004 that uses an index, such as a path and value index and/or an inverted index, to process array elements in an efficient way, such as when the index stores and returns multiple sorted values. For example, if: a) values are sorted descending, and b) aggregate function 830 returns a maximum value, then aggregate function 830 need only return the first of the sorted values.

11.0 Client's Example Database Driver

Figure 11:
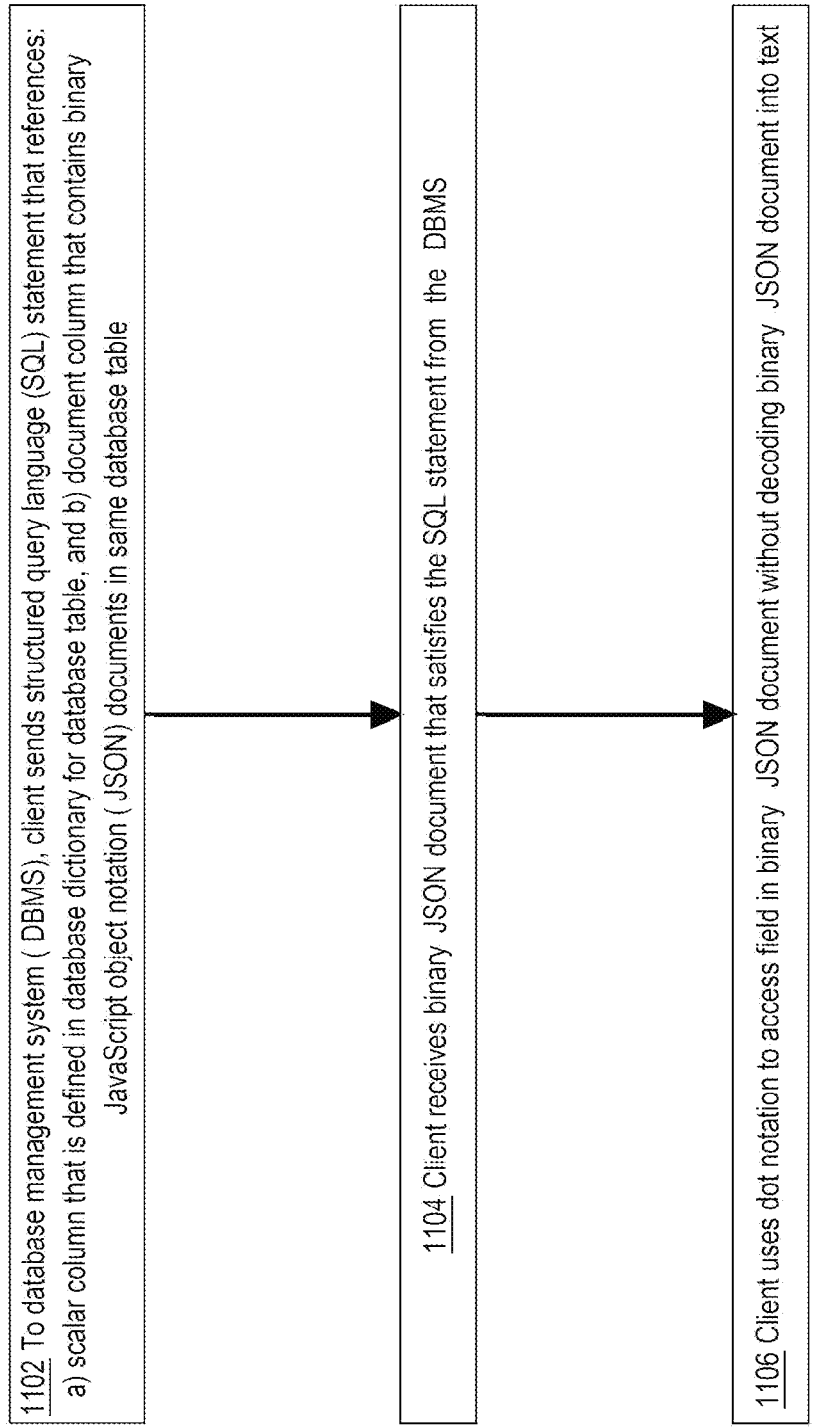
FIG. 11 is a flow diagram that depicts an example process for a client to receive and directly interrogate, with dot notation and without decoding, a binary JSON document.

FIG. 11 is a flow diagram that depicts a client receiving and directly interrogating, with dot notation and without decoding, a binary JSON document, in an embodiment. FIG. 11 entails a client innovation and need not correspond to earlier FIGs. herein. However, mechanisms and techniques for dot notation processing and acceleration as discussed earlier herein may be applied at the client to the process of FIG. 11.

A (e.g. ad hoc) client application may contain a database driver that may provide (e.g. remote) integration with any of the DBMSs presented elsewhere herein. All of the steps in FIG. 11 may be performed by a same client. The client may retrieve binary JSON document(s) from the DBMS.

In step 1102, the client sends to the DBMS a SQL statement that references in a database table: a) a scalar column that is defined in a database dictionary, and b) a JSON document column that contains binary JSON documents.

In step 1104, binary JSON document(s) may be received as instances of a JSON datatype that is native (i.e. built in, not user defined) to the DBMS, which may be a dense and/or optimized format such as OSON as discussed earlier herein.

A state of the art client's database driver may eagerly or lazily decode the JSON documents from dense binary to sparse text, such as raw JSON, which the client application may then process such as by parsing and/or inspecting. Whereas, clients' database drivers herein may be innovative and may, without decoding and without disassembly (e.g. unpacking), facilitate client applications to directly interrogate (e.g. inspect) the JSON document such as with dot notation, shown as step 1106.

In an embodiment, the client's database driver exposes (i.e. wraps) the binary JSON document as a document object model (DOM) that can be interrogated with JavaScript or other dot notation selectors or expressions of any depth (i.e. amount of dots) to reach leaves or intermediate nodes of the binary JSON document. In other words, the client's database driver may endow the binary JSON document with additional (e.g. navigational) behavior without decoding or otherwise disturbing the self contained contiguous dense binary encoded data of the JSON document. For example, the client's database driver may provide a fully operational DOM directly with the (e.g. OSON) data as originally received (e.g. wire format) from the DBMS.

Such interrogation may return fragments such as arrays or subtrees that may also be instances of the JSON datatype and/or subjected to subsequent interrogation as JSON documents themselves. In an embodiment, such fragments are returned by reference, such as without copying, extracting, or decoding data. In an embodiment where the JSON datatype is not OSON, a binary JSON document may be treated as a composite of nested smaller binary JSON documents that may be individually referenced and interrogated, such as a recursive data structure. Such nested objects need not be entirely self contained. For example, metadata such as an encoding dictionary may be: a) specified at a top level of a received binary JSON document, and b) implicitly shared with nested substructures, even after those nested substructures are returned by reference from the database driver to the client application. Thus, a client may seem to unpack, dissect, and inspect portions of a received binary JSON document, but all data access still delegates back to the monolithic binary data as originally received (i.e. still binary encoded and contiguous).

12.0 Example Client Server Cooperation Process

Figure 12:
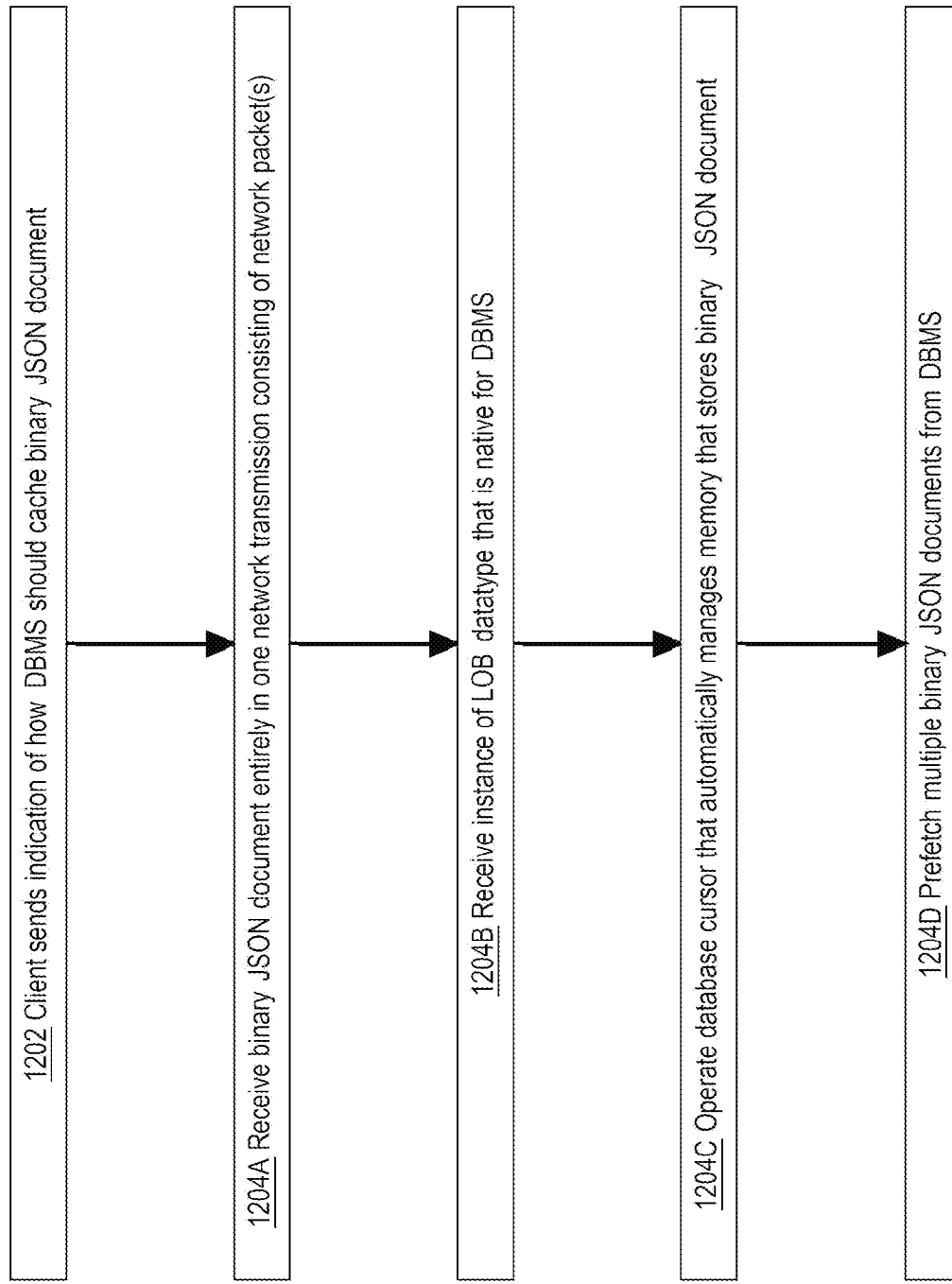
FIG. 12 is a flow diagram that depicts an example process of ways in which a client's database driver and DBMS may collaborate to retrieve binary JSON documents.

FIG. 12 is a flow diagram that depicts ways in which a client's database driver and DBMS may collaborate to retrieve binary JSON documents, in an embodiment. FIG. 12 is discussed with reference to FIG. 11.

A DBMS may send results to a client without the DBMS caching any of the results. The results may contain many lean values, such as small datatypes, that are inexpensive for the DBMS to load, marshal, and send to the client and for the client to receive, buffer, and unmarshal. It may be tolerable for the client to fetch more lean values from the DBMS than the client actually needs, and/or for the client to repeatedly fetch same lean values with repeated queries.

Whereas, bulky values (e.g. LOBs) may be too expensive to retrieve so casually. For example, the DBMS may instead send placeholders (i.e. handles) of LOBs in results, and the client can later use such a handle to (e.g. lazily) expressly fetch a LOB from the DBMS or never fetch that LOB if not actually needed. Mere loading of the LOB into the DBMS may be expensive, with or without sending the LOB to the client.

Thus, the DBMS may cache loaded LOBs such as for repeated or deferred transmission and/or querying. For example, a client may sequentially as follows: a) obtain a handle of a LOB in a result set, b) close the result set without having used the handle, c) fetch other result sets, and d) much later use the handle to fetch the LOB from the DBMS, hopefully from a DBMS cache, though not necessarily. The DBMS cache may be autonomous, such as with least recently used (LRU) eviction policy. However, a LOB may be huge (e.g. multiple database blocks), which may somewhat frustrate a cache policy.

For example a huge LOB might not be evicted until after many small LOBs are evicted, even if the huge LOB will not be needed again and the small LOBs will be. Thus for LOBs, caching need not be autonomous and may instead be more or less client driven. For example, a client may know exactly when a LOB is no longer needed and may tell the DBMS at that time by expressly releasing the LOB.

In an embodiment, a native JSON datatype may be implemented within a DBMS as a LOB datatype variant, as explained earlier herein. Thus, all of the techniques discussed above for FIG. 12 may directly apply to JSON documents. For example, a DBMS's JSON document cache and LOB cache may be a same (i.e. polymorphic) cache. For example, any of those above techniques may be implemented by DBMS logic that neither knows nor cares which objects are binary JSON documents and which are plain LOBs.

In some cases, a client may indicate in step 1202 a usage pattern, such as in a SQL statement, and the DBMS may manage JSON document caching according to the client's indication. For example one client may indicate sequential (e.g. OLAP or scan) access for a SQL statement or database session, and another client may indicate random (e.g. OLTP) access for another query or database session. The DBMS may recognize that random access should fill cache, and sequential access should not.

Whereas, any access may read (i.e. but not necessarily fill) cache. Likewise, step 1202 may instead indicate that any access can retrieve data from the cache, but that only reads and not writes may fill the cache. Also instead, step 1202 may indicate that a particular JSON document is or is not cacheable.

Steps 1204A-D entail various complementary ways for a client's database driver to receive binary JSON document(s). Thus any of steps 1204A-D, which are shown as separate steps, may be combined into a single step that combines techniques to receive JSON document(s). Thus, while each of steps 1204A-D are individually capable of receiving JSON documents, when steps are combined, still only one JSON document or batch of JSON documents is received. To receive more JSON documents, a same or different combination of steps 1204A-D may be repeated for each additional JSON document or batch of JSON documents, such as with different or repeated SQL statement(s).

In addition to having a database driver, the client may also have a network driver needed to communicate with the DBMS. In step 1204A the client's network driver receives exactly one or multiple binary JSON document(s) entirely in one network transmission consisting of network packet(s). For example and according to the transport layer (i.e. layer 4) of the open systems interconnection (OSI) network stack, the DBMS may send exactly one or multiple JSON documents in one service data unit (SDU), which OSI's lower levels may or may not split into multiple underlying protocol data units (PDUs) during transport for eventual reassembly back into one SDU for receipt by the client's network driver. For example, the client's network driver may reassemble the one SDU, which was received by the client computer as one or more (e.g. internet protocol, IP) packets or frames.

With such reassembly, the transmission appears monolithic as observed by the operating systems (OS) of the client and DBMS. For example, the client's database driver may treat the SDU payload as exactly one (or multiple) complete JSON document or LOB. In an embodiment: a) the transport protocol is user datagram protocol (UDP), b) there is exactly one JSON document per packet, c) the client's database driver can immediately process each JSON document when received, even when multiple JSON documents are expected such as in a result set, and d) the client's database driver is responsible for handling (e.g. reordering if significant) JSON documents received out of order, and for requesting retransmission of lost or garbled JSON documents.

In step 1204B, the client's database driver receives a JSON document as an instance of a LOB datatype variant that is native to the DBMS. Thus, both the client's database driver and the DBMS may exchange JSON documents more or less exactly as native LOBs, including polymorphic ancillary mechanisms such as caching as explained earlier herein.

In step 1204C, the client's database driver (e.g. remotely) operates a database cursor in the DBMS that automatically manages memory that stores binary JSON document(s). For example, the cursor may iterate over a result set of JSON documents, and advancing the cursor to a next JSON document in the results may: a) release (i.e. discard) a previous JSON document from memory of the DBMS, and b) load a next JSON document into memory of the DBMS. Cursor logic in the DBMS may polymorphically handle both of JSON documents and LOBs.

In step 1204D, the client prefetches multiple binary JSON documents from the DBMS. For example, such as with or without a database cursor in the DBMS, the client application may iterate over a result set, one JSON document at a time. Whereas, the client's database driver may prefetch multiple JSON documents from the DBMS as a batch.

Client prefetching may: a) reduce network round trips needed to iterate over a result set, and b) thus, often reduce latency for the database driver to provide a next JSON document to the client application. For example, a database driver may aggressively prefetch such that the client application almost never waits for a next JSON document. With or without prefetching, and with or without a database cursor, the database driver may automatically manage client memory to buffer or otherwise cache JSON documents. For example, the database driver may automatically evict a JSON document from client memory, such as according to: a) client iteration of a result set past the JSON document, b) express release by client application, c) simple garbage collection such as reference counting, and/or d) sophisticated garbage collection such as mark/sweep, such as with reified referencing semantics such as weak and strong reference mechanisms.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 13:
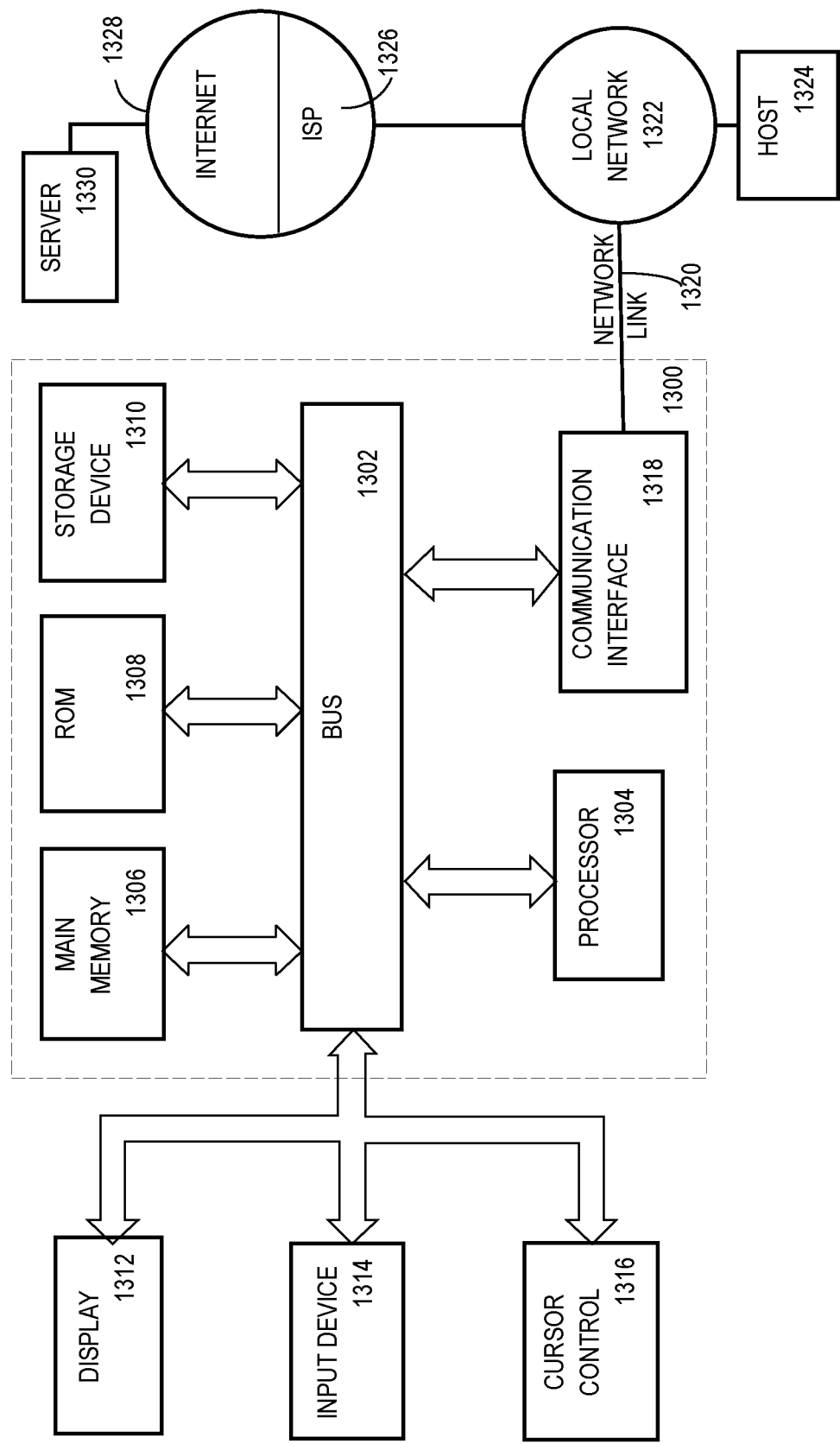
FIG. 13 is a block diagram that illustrates a computer system upon which an embodiment of the invention may be implemented.

For example, FIG. 13 is a block diagram that illustrates a computer system 1300 upon which an embodiment of the invention may be implemented. Computer system 1300 includes a bus 1302 or other communication mechanism for communicating information, and a hardware processor 1304 coupled with bus 1302 for processing information. Hardware processor 1304 may be, for example, a general purpose microprocessor.

Computer system 1300 also includes a main memory 1306, such as a random access memory (RAM) or other dynamic storage device, coupled to bus 1302 for storing information and instructions to be executed by processor 1304. Main memory 1306 also may be used for storing temporary variables or other intermediate information during execution of instructions to be executed by processor 1304. Such instructions, when stored in non-transitory storage media accessible to processor 1304, render computer system 1300 into a special-purpose machine that is customized to perform the operations specified in the instructions.

Computer system 1300 further includes a read only memory (ROM) 1308 or other static storage device coupled to bus 1302 for storing static information and instructions for processor 1304. A storage device 1310, such as a magnetic disk, optical disk, or solid-state drive is provided and coupled to bus 1302 for storing information and instructions.

Computer system 1300 may be coupled via bus 1302 to a display 1312, such as a cathode ray tube (CRT), for displaying information to a computer user. An input device 1314, including alphanumeric and other keys, is coupled to bus 1302 for communicating information and command selections to processor 1304. Another type of user input device is cursor control 1316, such as a mouse, a trackball, or cursor direction keys for communicating direction information and command selections to processor 1304 and for controlling cursor movement on display 1312. This input device typically has two degrees of freedom in two axes, a first axis (e.g., x) and a second axis (e.g., y), that allows the device to specify positions in a plane.

Computer system 1300 may implement the techniques described herein using customized hard-wired logic, one or more ASICs or FPGAs, firmware and/or program logic which in combination with the computer system causes or programs computer system 1300 to be a special-purpose machine. According to one embodiment, the techniques herein are performed by computer system 1300 in response to processor 1304 executing one or more sequences of one or more instructions contained in main memory 1306. Such instructions may be read into main memory 1306 from another storage medium, such as storage device 1310. Execution of the sequences of instructions contained in main memory 1306 causes processor 1304 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 1310. Volatile media includes dynamic memory, such as main memory 1306. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1302. Transmission media can also take the form of acoustic or light waves, such as those generated during radio-wave and infra-red data communications.

Various forms of media may be involved in carrying one or more sequences of one or more instructions to processor 1304 for execution. For example, the instructions may initially be carried on a magnetic disk or solid-state drive of a remote computer. The remote computer can load the instructions into its dynamic memory and send the instructions over a telephone line using a modem. A modem local to computer system 1300 can receive the data on the telephone line and use an infra-red transmitter to convert the data to an infra-red signal. An infra-red detector can receive the data carried in the infra-red signal and appropriate circuitry can place the data on bus 1302. Bus 1302 carries the data to main memory 1306, from which processor 1304 retrieves and executes the instructions. The instructions received by main memory 1306 may optionally be stored on storage device 1310 either before or after execution by processor 1304.

Computer system 1300 also includes a communication interface 1318 coupled to bus 1302. Communication interface 1318 provides a two-way data communication coupling to a network link 1320 that is connected to a local network 1322. For example, communication interface 1318 may be an integrated services digital network (ISDN) card, cable modem, satellite modem, or a modem to provide a data communication connection to a corresponding type of telephone line. As another example, communication interface 1318 may be a local area network (LAN) card to provide a data communication connection to a compatible LAN. Wireless links may also be implemented. In any such implementation, communication interface 1318 sends and receives electrical, electromagnetic or optical signals that carry digital data streams representing various types of information.

Network link 1320 typically provides data communication through one or more networks to other data devices. For example, network link 1320 may provide a connection through local network 1322 to a host computer 1324 or to data equipment operated by an Internet Service Provider (ISP) 1326. ISP 1326 in turn provides data communication services through the world wide packet data communication network now commonly referred to as the "Internet" 1328. Local network 1322 and Internet 1328 both use electrical, electromagnetic or optical signals that carry digital data streams. The signals through the various networks and the signals on network link 1320 and through communication interface 1318, which carry the digital data to and from computer system 1300, are example forms of transmission media.

Computer system 1300 can send messages and receive data, including program code, through the network(s), network link 1320 and communication interface 1318. In the Internet example, a server 1330 might transmit a requested code for an application program through Internet 1328, ISP 1326, local network 1322 and communication interface 1318.

The received code may be executed by processor 1304 as it is received, and/or stored in storage device 1310, or other non-volatile storage for later execution.

Software Overview

Figure 14:
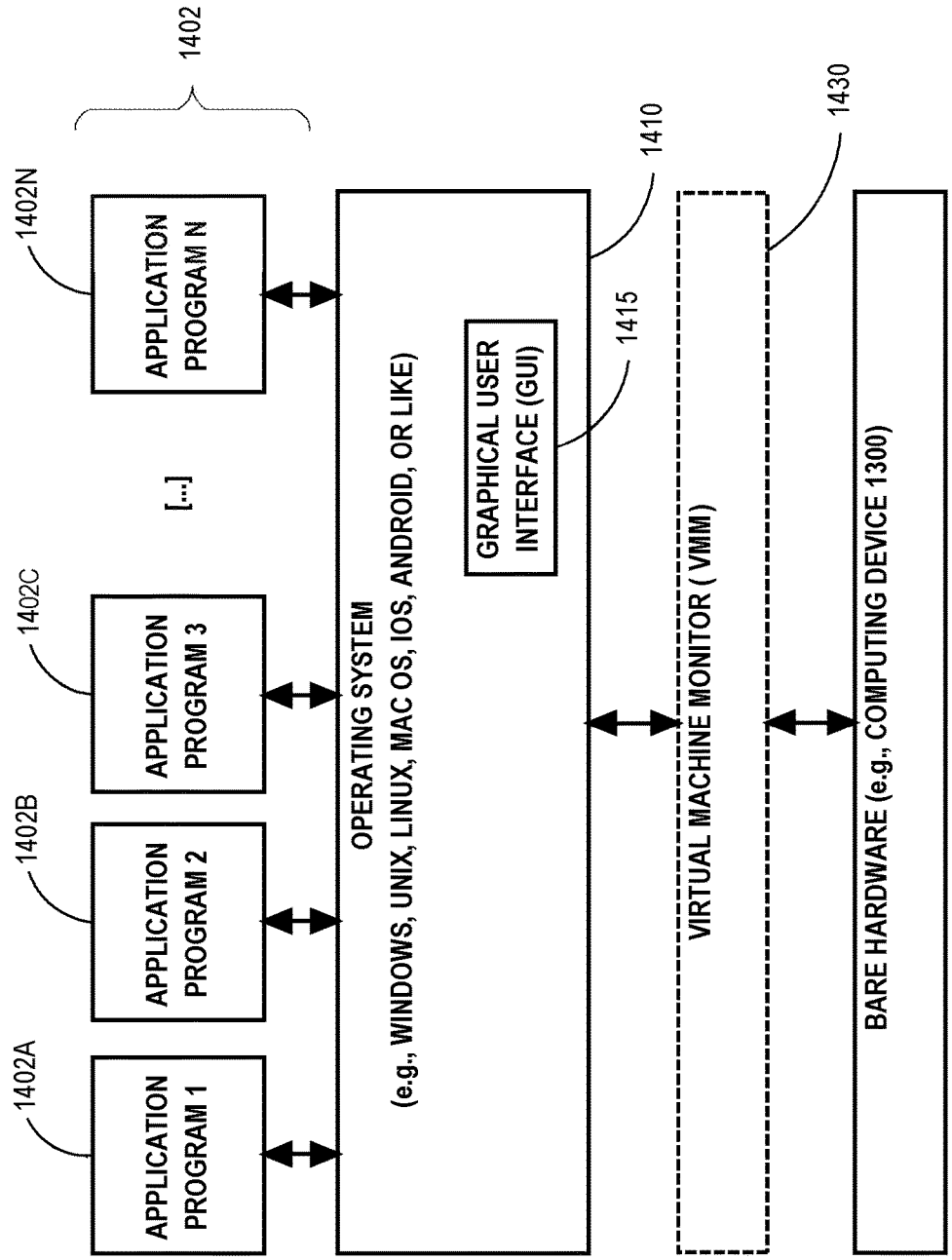
FIG. 14 is a block diagram that illustrates a basic software system that may be employed for controlling the operation of a computing system.

FIG. 14 is a block diagram of a basic software system 1400 that may be employed for controlling the operation of computing system 1300. Software system 1400 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 1400 is provided for directing the operation of computing system 1300. Software system 1400, which may be stored in system memory (RAM) 1306 and on fixed storage (e.g., hard disk or flash memory) 1310, includes a kernel or operating system (OS) 1410.

The OS 1410 manages low-level aspects of computer operation, including managing execution of processes, memory allocation, file input and output (I/O), and device I/O. One or more application programs, represented as 1402A, 1402B, 1402C . . . 1402N, may be "loaded" (e.g., transferred from fixed storage 1310 into memory 1306) for execution by the system 1400. The applications or other software intended for use on computer system 1300 may also be stored as a set of downloadable computer-executable instructions, for example, for downloading and installation from an Internet location (e.g., a Web server, an app store, or other online service).

Software system 1400 includes a graphical user interface (GUI) 1415, for receiving user commands and data in a graphical (e.g., "point-and-click" or "touch gesture") fashion. These inputs, in turn, may be acted upon by the system 1400 in accordance with instructions from operating system 1410 and/or application(s) 1402. The GUI 1415 also serves to display the results of operation from the OS 1410 and application(s) 1402, whereupon the user may supply additional inputs or terminate the session (e.g., log off).

OS 1410 can execute directly on the bare hardware 1420 (e.g., processor(s) 1304) of computer system 1300. Alternatively, a hypervisor or virtual machine monitor (VMM) 1430 may be interposed between the bare hardware 1420 and the OS 1410. In this configuration, VMM 1430 acts as a software "cushion" or virtualization layer between the OS 1410 and the bare hardware 1420 of the computer system 1300.

VMM 1430 instantiates and runs one or more virtual machine instances ("guest machines"). Each guest machine comprises a "guest" operating system, such as OS 1410, and one or more applications, such as application(s) 1402, designed to execute on the guest operating system. The VMM 1430 presents the guest operating systems with a virtual operating platform and manages the execution of the guest operating systems.

In some instances, the VMM 1430 may allow a guest operating system to run as if it is running on the bare hardware 1420 of computer system 1400 directly. In these instances, the same version of the guest operating system configured to execute on the bare hardware 1420 directly may also execute on VMM 1430 without modification or reconfiguration. In other words, VMM 1430 may provide full hardware and CPU virtualization to a guest operating system in some instances.

In other instances, a guest operating system may be specially designed or configured to execute on VMM 1430 for efficiency. In these instances, the guest operating system is "aware" that it executes on a virtual machine monitor. In other words, VMM 1430 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g. content of registers) between allotments of the hardware processor time when the computer system process is not running. Computer system processes run under the control of an operating system, and may run under the control of other programs being executed on the computer system.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprise two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure and applications.

The above-described basic computer hardware and software and cloud computing environment presented for purpose of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

Database Overview

Embodiments of the present invention are used in the context of database management systems (DBMSs). Therefore, a description of an example DBMS is provided.

Generally, a server, such as a database server, is a combination of integrated software components and an allocation of computational resources, such as memory, a node, and processes on the node for executing the integrated software components, where the combination of the software and computational resources are dedicated to providing a particular type of function on behalf of clients of the server. A database server governs and facilitates access to a particular database, processing requests by clients to access the database.

Users interact with a database server of a DBMS by submitting to the database server commands that cause the database server to perform operations on data stored in a database. A user may be one or more applications running on a client computer that interact with a database server. Multiple users may also be referred to herein collectively as a user.

Database Dictionary

A database comprises data and a database dictionary that is stored on a persistent memory mechanism, such as a set of hard disks. A database is defined by its own separate database dictionary. A database dictionary may comprise multiple data structures that store database metadata. A database dictionary may for example, comprise multiple files and tables. Portions of the data structures may be cached in main memory of a database server.

A database dictionary comprises metadata that defines database objects contained in a database. In effect, a database dictionary defines much of a database. When a database object is said to be defined by a database dictionary, the database dictionary contains metadata that defines properties of the database object. For example, metadata in a database dictionary defining a database table may specify the column names and datatypes of the columns, and one or more files or portions thereof that store data for the table. Metadata in the database dictionary defining a procedure may specify a name of the procedure, the procedure's arguments and the return datatype and the datatypes of the arguments, and may include source code and a compiled version thereof.

Database objects include tables, table columns, and tablespaces. A tablespace is a set of one or more files that are used to store the data for various types of database objects, such as a table. If data for a database object is stored in a tablespace, a database dictionary maps a database object to one or more tablespaces that hold the data for the database object.

A database object may be defined by the database dictionary, but the metadata in the database dictionary itself may only partly specify the properties of the database object. Other properties may be defined by data structures that may not be considered part of the database dictionary. For example, a user defined function implemented in a JAVA class may be defined in part by the database dictionary by specifying the name of the users defined function and by specifying a reference to a file containing the source code of the Java class (i.e., java file) and the compiled version of the class (i.e., class file).

Database Operation

A database dictionary is referred to by a DBMS to determine how to execute database commands submitted to a DBMS. Database commands can access the database objects that are defined by the dictionary. A database command may be in the form of a database statement. For the database server to process the database statements, the database statements must conform to a database language supported by the database server. One non-limiting example of a database language that is supported by many database servers is SQL, including proprietary forms of SQL supported by such database servers as Oracle, (e.g. Oracle Database 11g). SQL data definition language ("DDL") instructions are issued to a database server to create or configure database objects, such as tables, views, or complex types. Data manipulation language ("DML") instructions are issued to a DBMS to manage data stored within a database structure. For instance, SELECT, INSERT, UPDATE, and DELETE are common examples of DML instructions found in some SQL implementations. SQL/XML is a common extension of SQL used when manipulating XML data in an object-relational database.

A multi-node database management system is made up of interconnected nodes that share access to the same database. Typically, the nodes are interconnected via a network and share access, in varying degrees, to shared storage, e.g. shared access to a set of disk drives and data blocks stored thereon. The nodes in a multi-node database system may be in the form of a group of computers (e.g. work stations, personal computers) that are interconnected via a network. Alternately, the nodes may be the nodes of a grid, which is composed of nodes in the form of server blades interconnected with other server blades on a rack.

Each node in a multi-node database system hosts a database server. A server, such as a database server, is a combination of integrated software components and an allocation of computational resources, such as memory, a node, and processes on the node for executing the integrated software components on a processor, the combination of the software and computational resources being dedicated to performing a particular function on behalf of one or more clients.

Resources from multiple nodes in a multi-node database system can be allocated to running a particular database server's software. Each combination of the software and allocation of resources from a node is a server that is referred to herein as a "server instance" or "instance". A database server may comprise multiple database instances, some or all of which are running on separate computers, including separate server blades.

Query Processing

A query is an expression, command, or set of commands that, when executed, causes a server to perform one or more operations on a set of data. A query may specify source data object(s), such as table(s), column(s), view(s), or snapshot(s), from which result set(s) are to be determined.

For example, the source data object(s) may appear in a FROM clause of a Structured Query Language ("SQL") query. SQL is a well-known example language for querying database objects. As used herein, the term "query" is used to refer to any form of representing a query, including a query in the form of a database statement and any data structure used for internal query representation. The term "table" refers to any source object that is referenced or defined by a query and that represents a set of rows, such as a database table, view, or an inline query block, such as an inline view or subquery.

The query may perform operations on data from the source data object(s) on a row by-row basis as the object(s) are loaded or on the entire source data object(s) after the object(s) have been loaded. A result set generated by some operation(s) may be made available to other operation(s), and, in this manner, the result set may be filtered out or narrowed based on some criteria, and/or joined or combined with other result set(s) and/or other source data object(s).

A subquery is a portion or component of a query that is distinct from other portion(s) or component(s) of the query and that may be evaluated separately (i.e., as a separate query) from the other portion(s) or component(s) of the query. The other portion(s) or component(s) of the query may form an outer query, which may or may not include other subqueries. A subquery nested in the outer query may be separately evaluated one or more times while a result is computed for the outer query.

Generally, a query parser receives a query statement and generates an internal query representation of the query statement. Typically, the internal query representation is a set of interlinked data structures that represent various components and structures of a query statement.

The internal query representation may be in the form of a graph of nodes, each interlinked data structure corresponding to a node and to a component of the represented query statement. The internal representation is typically generated in memory for evaluation, manipulation, and transformation.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
   receiving, by a database management system (DBMS) that stores a plurality of JavaScript object notation (JSON) documents, a structured query language (SQL) statement that uses elision to specify an aggregation function;
   identifying a subset of the plurality of JSON documents that satisfy the SQL statement;
   for each JSON document of the subset of the plurality of JSON documents, applying the aggregation function individually to said each JSON document to calculate a respective aggregate value of said each JSON document of a set of aggregate values; and
   generating a result set that contains at least one respective aggregate value of said set of respective aggregate values for the subset of the plurality of JSON documents.

2. The method of claim 1 wherein:
   the aggregation function comprises one selected from a group consisting of: maximum, minimum, mean, sum, count, and a user defined function (UDF);
   said applying the aggregation function individually to said each JSON document of the subset of the plurality of JSON documents comprises applying the aggregation function to a JSON document of the subset of the plurality of JSON documents.

3. The method of claim 1 wherein:
   said applying the aggregation function individually to said each JSON document of the subset of the plurality of JSON documents comprises applying the aggregation function to an aggregation in a JSON document of the subset of the plurality of JSON documents;
   the aggregation in the JSON document of the subset of the plurality of JSON documents comprises one selected from a group consisting of: an array, a repeated field, and a repeated substructure.

4. The method of claim 3 wherein:
   said applying the aggregation function to said aggregation in said JSON document of the subset of the plurality of JSON documents comprises using an index for processing elements of the aggregation in the JSON document of the subset of the plurality of JSON documents.

5. The method of claim 4 wherein said processing elements of the aggregation in the JSON document of the subset of the plurality of JSON documents comprises at least one selected from a group consisting of: sorting and filtration.

6. The method of claim 4 wherein said index for processing elements of the aggregation in the JSON document of the subset of the plurality of JSON documents comprises an inverted index.

7. The method of claim 1 wherein the result set contains one selected from a group consisting of:
   a respective row for each aggregate value in said set of respective aggregate values for the subset of the plurality of JSON documents, and
   a respective array element, in an array, for each aggregate value in said set of respective aggregate values for the subset of the plurality of JSON documents.

8. The method of claim 1 wherein:
   the aggregation function comprises a user defined function (UDF);
   the method further comprises detecting at least one selected from a group consisting of:
      the UDF does not contain an infinite loop, and
      recursion of the UDF cannot exceed a threshold depth.

9. The method of claim 8 wherein said detecting is at least one detecting selected from a group consisting of:
   a detecting that is not based on the UDF,
   a detecting that does not occur while the UDF operates, and
   a detecting that is based on an actual argument value of the UDF.

10. The method of claim 8 wherein:
    the SQL statement contains two call sites that separately invoke the UDF;
    said detecting is separately performed for each call site of the two call sites.

11. One or more non-transitory computer-readable media storing instructions that, when executed by one or more processors, cause:
    receiving, by a database management system (DBMS) that stores a plurality of JavaScript object notation (JSON) documents, a structured query language (SQL) statement that uses elision to specify an aggregation function;

identifying a subset of the plurality of JSON documents that satisfy the SQL statement;

for each JSON document of the subset of the plurality of JSON documents, applying the aggregation function individually to said each JSON document to calculate a respective aggregate value of said each JSON document of a set of aggregate values; and generating a result set that contains at least one respective aggregate value of said set of respective aggregate values for the subset of the plurality of JSON documents.

12. The one or more non-transitory computer-readable media of claim 11 wherein:

the aggregation function comprises one selected from a group consisting of: maximum, minimum, mean, sum, count, and a user defined function (UDF);

said applying the aggregation function individually to said each JSON document of the subset of the plurality of JSON documents comprises applying the aggregation function to a JSON document of the subset of the plurality of JSON documents.

13. The one or more non-transitory computer-readable media of claim 11 wherein:

said applying the aggregation function individually to said each JSON document of the subset of the plurality of JSON documents comprises applying the aggregation function to an aggregation in a JSON document of the subset of the plurality of JSON documents;

the aggregation in the JSON document of the subset of the plurality of JSON documents comprises one selected from a group consisting of: an array, a repeated field, and a repeated substructure.

14. The one or more non-transitory computer-readable media of claim 13 wherein:

said applying the aggregation function to said aggregation in said JSON document of the subset of the plurality of JSON documents comprises using an index for processing elements of the aggregation in the JSON document of the subset of the plurality of JSON documents.

15. The one or more non-transitory computer-readable media of claim 14 wherein said processing elements of the aggregation in the JSON document of the subset of the plurality of JSON documents comprises at least one selected from a group consisting of: sorting and filtration.

16. The one or more non-transitory computer-readable media of claim 14 wherein said index for processing elements of the aggregation in the JSON document of the subset of the plurality of JSON documents comprises an inverted index.

17. The one or more non-transitory computer-readable media of claim 11 wherein the result set contains one selected from a group consisting of:

a respective row for each aggregate value in said set of respective aggregate values for the subset of the plurality of JSON documents, and a respective array element, in an array, for each aggregate value in said set of respective aggregate values for the subset of the plurality of JSON documents.

18. The one or more non-transitory computer-readable media of claim 11 wherein:

the aggregation function comprises a user defined function (UDF);

the instructions further cause detecting at least one selected from a group consisting of:

the UDF does not contain an infinite loop, and recursion of the UDF cannot exceed a threshold depth.

* * * * *

UNITED STATES PATENT AND TRADEMARK OFFICE
CERTIFICATE OF CORRECTION

PATENT NO. : 11,899,644 B2
APPLICATION NO. : 17/860187
DATED : February 13, 2024
INVENTOR(S) : Liu et al.

It is certified that error appears in the above-identified patent and that said Letters Patent is hereby corrected as shown below:

In the Specification

In Column 1, Line 63, delete ""0"" and insert -- "{ }" --, therefor.

In Column 1, Line 66, delete ""H"." and insert -- "[]". --, therefor.

In Column 7, Line 2, delete "orb)" and insert -- or b) --, therefor.

Signed and Sealed this
Fourteenth Day of May, 2024

Katherine Kelly Vidal
*Director of the United States Patent and Trademark Office*